(12) United States Patent
Zhang

(10) Patent No.: US 11,872,517 B2
(45) Date of Patent: Jan. 16, 2024

(54) GAS ADSORPTION AND SEPARATION APPARATUS AND APPLICATIONS THEREOF

(71) Applicant: SHANGHAI SHENCHENG ENVIRONMENTAL PROTECTION EQUIPMENT & ENGINEERING CO., LTD., Shanghai (CN)

(72) Inventor: Chuanzhong Zhang, Shanghai (CN)

(73) Assignee: SHANGHAI SHENCHENG ENVIRONMENTAL PROTECTION EQUIPMENT & ENGINEERING CO., LTD., Shanghai (CN)

( * ) Notice: Subject to any disclaimer, the term of this patent is extended or adjusted under 35 U.S.C. 154(b) by 434 days.

(21) Appl. No.: 17/259,078

(22) PCT Filed: Jul. 9, 2019

(86) PCT No.: PCT/CN2019/095230
§ 371 (c)(1),
(2) Date: Jan. 8, 2021

(87) PCT Pub. No.: WO2020/011156
PCT Pub. Date: Jan. 16, 2020

(65) Prior Publication Data
US 2021/0268426 A1     Sep. 2, 2021

(30) Foreign Application Priority Data

Jul. 9, 2018    (CN) .......................... 201810794980.5
Sep. 20, 2018   (CN) .......................... 201811144414.6

(51) Int. Cl.
  *B01D 53/04*    (2006.01)
  *B01D 53/08*    (2006.01)
  *B01D 53/047*   (2006.01)

(52) U.S. Cl.
  CPC ..... *B01D 53/0438* (2013.01); *B01D 53/0446* (2013.01); *B01D 53/0462* (2013.01);
  (Continued)

(58) Field of Classification Search
  CPC ................ B01D 53/04; B01D 53/0438; B01D 53/0446; B01D 53/0462; B01D 53/0476;
  (Continued)

(56) References Cited

U.S. PATENT DOCUMENTS 5,169,414 A * 12/1992 Panzica ................. F24F 3/1423
                                                      96/125
7,875,102 B2    1/2011 Gadkaree et al.
(Continued)

FOREIGN PATENT DOCUMENTS

CN    102015068    4/2011
CN    103894040    7/2014
(Continued)

OTHER PUBLICATIONS

Notice of Reasons for Refusal issued for Japanese Patent Application No. 2021-521874, Dispatch Date: Feb. 1, 2022, 12 pages including English machine translation.
(Continued)

*Primary Examiner* — Frank M Lawrence, Jr.
(74) *Attorney, Agent, or Firm* — Hamre, Schumann, Mueller & Larson, P.C.

(57) ABSTRACT

A gas adsorption and separation apparatus has an adsorption functional module and a functional module. A main functional portion of the adsorption functional module is an adsorption series composed of two or more adsorption units arranged in sequence The adsorption series has a head end and a tail end. A gas to be separated passes through the adsorption series in a direction from the head end to the tail end. When reaching a preset degree of saturation adsorption
(Continued)

of the adsorbate gas, the adsorption unit located at the head end is detached from the adsorption series and enters the further functional module and sequentially re-enters the adsorption series from the tail end. Each adsorption unit is an adsorptive fixed bed composed of an adsorbent and a mechanical support structure and has a proper mechanical strength and good permeability. The adsorption unit which has completed saturated adsorption is referred to as a saturated adsorption unit, and the adsorption unit which has completed desorption and regeneration is referred to as a regenerated adsorption unit (092).

12 Claims, 18 Drawing Sheets

(52) U.S. Cl.
CPC .. *B01D 53/0476* (2013.01); *B01D 2258/0283* (2013.01); *B01D 2259/402* (2013.01); *B01D 2259/40005* (2013.01)

(58) Field of Classification Search
CPC .. B01D 53/047; B01D 53/0407; B01D 53/08; B01D 2257/70; B01D 2258/0283; B01D 2259/40005; B01D 2259/402; Y02A 50/20
USPC ............. 96/123, 124, 150; 95/107, 115
See application file for complete search history.

(56) References Cited

U.S. PATENT DOCUMENTS

| | | | |
|---|---|---|---|
| 7,959,712 B2 * | 6/2011 | Kim | ........... B01D 53/0462 95/107 |
| 2003/0035770 A1 | 2/2003 | Cole | |
| 2009/0249954 A1 | 10/2009 | Gadkaree et al. | |

FOREIGN PATENT DOCUMENTS

| | | | |
|---|---|---|---|
| JP | S6291224 | A | 4/1987 |
| JP | H01155927 | A | 6/1989 |
| JP | H11192410 | A | 7/1999 |
| JP | 2000237527 | A | 9/2000 |
| JP | 2001137646 | A | 5/2001 |
| JP | 2001314494 | A | 11/2001 |
| JP | 2003501247 | A | 1/2003 |
| JP | 2009178711 | A | 8/2009 |
| KR | 20180032798 | A * | 4/2018 |
| WO | 2007004426 | A1 | 1/2007 |

OTHER PUBLICATIONS

International Search Report issued for International Patent Application No. PCT/CN2019/095230, dated Sep. 27, 2019, 7 pages including English translation.

* cited by examiner

Prior Art
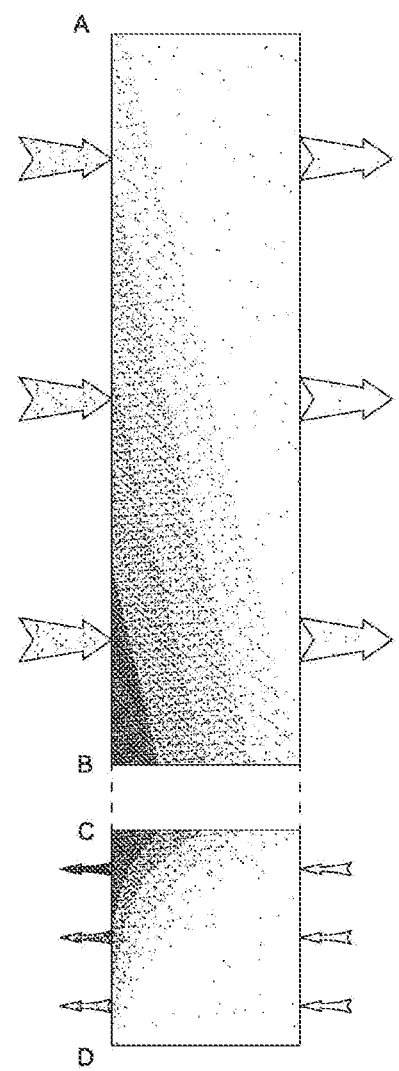
Prior Art
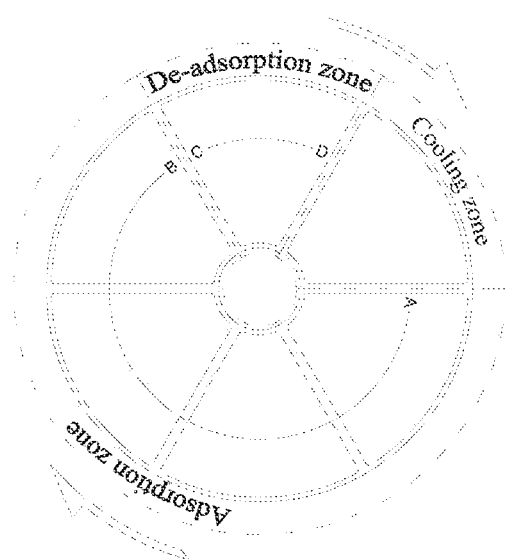
FIG.1
FIG.2

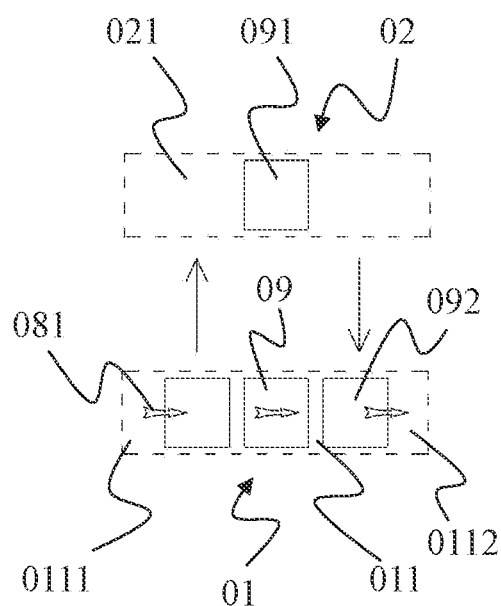
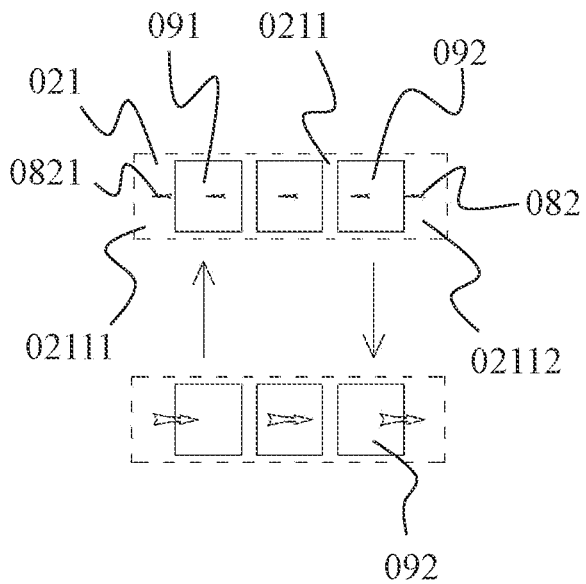
FIG.3
FIG.4
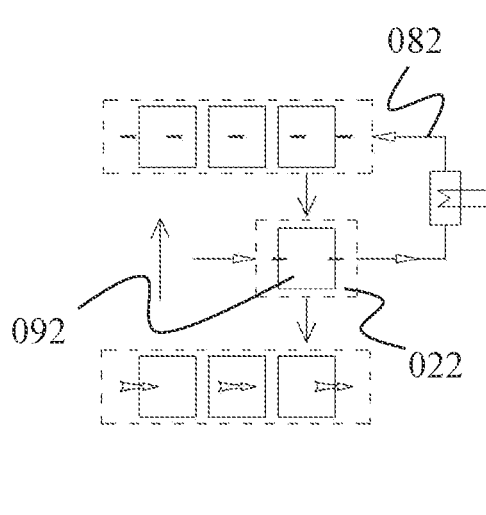
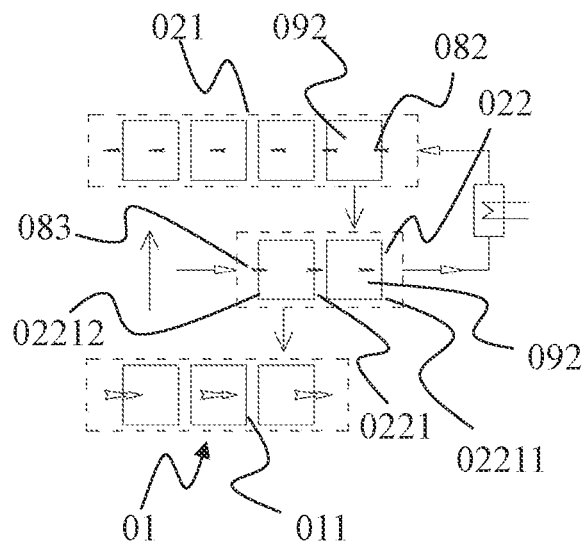
FIG.5
FIG.6

GAS ADSORPTION AND SEPARATION APPARATUS AND APPLICATIONS THEREOF

CROSS REFERENCE TO RELATED APPLICATIONS

The present application claims the priority of Chinese patent application 201810794980.5 filed on Jul. 9, 2018 and Chinese patent application 201811144414.6 filed on Sep. 20, 2018, and these earlier applications are incorporated herein by reference.

TECHNICAL FIELD

The present invention relates to a gas adsorption and separation apparatus, and in particular, to an apparatus for concentrating organic waste gas pollutants by using an adsorption method, and specific applications thereof.

BACKGROUND ART

Gas concentration technologies using an adsorption method have been more and more widely used in the field of atmospheric volatile organic compound (VOC, referred to as organic pollutants for short) pollution control. Common gas adsorption and separation apparatuses include rotary adsorbers and regenerative fixed-bed adsorbers. The ultimate goal of design of these gas adsorption and separation apparatuses is to concentrate waste gas of organic pollutants as much as possible and make the organic pollutants in the waste gas discharged after treatment reach or lower than a standard discharge concentration specified by the government. In other words, these apparatuses are designed for two objectives: high concentration ratio and low emission concentration.

In terms of improvement of the concentration ratio, the adsorption and separation apparatuses should adsorb organic pollutants as much as possible. In extreme situations, all adsorbents should reach saturated adsorption, which will inevitably lead to the emission concentration of the treated waste gas exceeding the standard seriously. In the worst situation, the concentration of the waste gas discharged after treatment in some areas (for rotary adsorbers) or in a certain time period (for regenerative fixed-bed adsorbers) is the same as that of incoming waste gas. The significance of pursuing for a high concentration ratio lies in that after gas concentration, the organic pollutants with a high concentration ratio is subjected to a further treatment such as oxidation and destruction without the need for adding fuel gas such that the low-concentration fuel gas is subjected to stable combustion, including but not limited to direct combustion, catalytic combustion, regenerative combustion or catalytic regenerative combustion; or that the capacity of the gas needing to be treated can be reduced during liquefaction, capture and recovery, thereby reducing considerable expenses.

In terms of emission concentration control, the organic pollutants should be transferred to a desorption process before passing through an adsorption bed, and the adsorption bed should be completely desorbed as far as possible in the desorption process. In extreme situations, all adsorbents in the adsorption bed should be completely desorbed, which inevitably results in that the concentration ratio is greatly reduced until there is no concentration effect at all, or even the process becomes a dilution process. Since the desorption process is a dilution process in which the concentration of an adsorbate decreases exponentially in terms of the thermodynamic principle, clean air with zero concentration of organic pollutants, which is used for desorption, will also become polluted air.

In practical applications, all design solutions compromise between two extreme conditions according to actual parameters of specific applications, to achieve an acceptable treatment result between two opposing objectives: concentration ratio and emission concentration. FIG. 1 is a schematic diagram of functional zoning of a rotary adsorber, and the distribution of organic pollutant concentration in the cross-section along an arc line of A to B in an adsorption zone and an arc line of C to D in a desorption zone in a direction of gas flow of an adsorption bed is roughly shown in FIG. 2. When the rotary adsorber is transferred out of the adsorption zone, a large part of the outflow side of the gas flow cannot reach saturation, while in the desorption zone, the degree of saturation of the area through which most of a desorption gas passes is very low. Similarly, the concentration distribution of organic pollutants in the cross-sectional space of the regenerative fixed-bed adsorber perpendicular to the gas flow direction is uniform in an ideal condition, and the variation law, which is on a time axis, of the organic pollutant concentration in each linear area, which is consistent with the gas flow direction, in the longitudinal section also conforms to the law shown in FIG. 2.

Herein, the term "desorption" is also called de-adsorption in the industry, and their meanings are exactly the same.

There is a great need for the above gas adsorption and separation apparatuses in many applications.

For example, in the field of VOC waste gas treatment, flue gas generated in the casting process of a metal casting resin mold has special characteristics, and its main adverse effect is the malodor intrusion to factory staff and the surrounding environment. Among existing ordinary treatment processes for treating VOC or conventional organic malodorous gases, photocatalytic and low-temperature plasma removal have low efficiency and poor effects. Due to the complex composition of the gas producing malodor, the rotary adsorber or the regenerative fixed-bed adsorber has poor adsorption effects. In order to ensure the adsorption effect, a very long adsorption process has to be used, which significantly increases costs of adsorption and desorption. In addition, there is also the problem of rapid failure of the adsorbent due to being covered by macromolecular colloids.

It is difficult to eliminate the macromolecular colloids through low-temperature catalytic combustion, and the adsorbent is likely to be covered and failed, while when direct combustion, regenerative combustion or catalytic combustion is used, the calorific value of combustible gas contained in flue gas itself is extremely low due to a huge air flow, making the fuel consumption economically unbearable. In addition, there are some problems, for example, combustible condensate is accumulated in a flue gas collection pipeline, and easily causes a sudden fire when dripping onto a high-temperature casting body.

The existing solution in the industry is to ignite the combustible condensate regularly for incineration and removal under fire protection, which requires shutdown and removal of a ventilation device in a preparation stage, and requires the dispatching of social firefighters and devices for prevention during implementation. During incineration, a large amount of smoke and organic waste gas will be generated due to incomplete combustion, which is a significant air pollution process.

Therefore, it is urgent for those of ordinary skill in the art to develop a gas adsorption and separation apparatus with both a high concentration ratio and a low emission concentration, so as to apply to the above various application scenarios.

SUMMARY OF THE INVENTION

A gas adsorption and separation apparatus disclosed in the present invention fundamentally resolves the contradiction of the above two objectives, so that the gas adsorption and separation apparatus can achieve both a high concentration ratio and a low emission concentration.

A first aspect of the present invention relates to a gas adsorption and separation apparatus, comprising an adsorption functional module and a further functional module, wherein a main functional portion of the adsorption functional module is an adsorption series composed of two or more adsorption units arranged in sequence; the adsorption series comprises a head end and a tail end; a gas to be separated passes through the adsorption series in a direction from the head end to the tail end; when reaching a preset degree of saturation adsorption of the adsorbate gas, the adsorption unit located at the head end is detached from the adsorption series and enter the further functional module comprising a desorption apparatus, and sequentially re-enters the adsorption series from the tail end after a further process treatment including a desorption treatment is completed; and each adsorption unit is an adsorptive fixed bed which is composed of an adsorbent and a mechanical support structure and has a proper mechanical strength and a good permeability, the adsorption unit which has completed saturated adsorption becomes a saturated adsorption unit, and the adsorption unit which has completed desorption and regeneration becomes a regenerated adsorption unit.

In the above technical solution, an adsorption-desorption mode used is any one of temperature swing adsorption, pressure swing adsorption and temperature and pressure swing adsorption.

In a preferred embodiment, the adsorption-desorption mode used is temperature swing adsorption, a main functional portion of the desorption apparatus is a desorption series composed of two or more saturated adsorption units arranged in sequence, which comprises a saturation end and a regeneration end, a high-temperature desorption gas passes through the desorption series in a direction from the regeneration end to the saturation end to generate a concentrated adsorbate gas, and the saturated adsorption unit is detached from the desorption series after completing desorption and regeneration.

More preferably, the further functional module further comprises a thermal regeneration apparatus, which transfers, to the desorption gas, heat contained in the regenerated adsorption unit which has completed the desorption and regeneration and is in a high-temperature state.

Specifically, a main functional portion of the thermal regeneration apparatus is a thermal regeneration series composed of two or more high-temperature regenerated adsorption units arranged in sequence, which comprises a hot end and a cold end, the high-temperature thermally regenerated adsorption unit that has completed the desorption is added into the thermal regeneration series from the hot end, a thermal regeneration gas passes through the thermal regeneration series in a direction from the cold end to the hot end and is heated to generate the high-temperature desorption gas, which enters the desorption apparatus, and a low-temperature regenerated adsorption unit that has completed heat exchange is detached from the thermal regeneration series from the cold end.

Preferably, the transfer and conversion of the adsorption unit between the functional modules are completed through a unit moving apparatus which is capable of transferring the adsorption unit between the functional modules.

In addition, the adsorption-desorption mode used is temperature swing adsorption, and the conversion of the adsorption unit between an adsorption apparatus, the desorption apparatus and the thermal regeneration apparatus is implemented by on-off and switching of pipeline valves. In this case, the on-off and switching of the pipeline valves are implemented by a pipeline switching disc comprising a series of stop valves and a group of switching valves.

In another preferred embodiment, the adsorption units constituting the adsorption apparatus, the regeneration apparatus and a thermal recovery apparatus unidirectionally and intermittently move along a closed track in a marshaled or separate manner under the driving of power, and an adsorption bed, the regeneration apparatus and the thermal recovery apparatus each form a marshaling, and the conversion of an adsorption section between the adsorption bed, the regeneration apparatus and the thermal recovery apparatus is completed through marshaling change.

Preferably, the closed track has any shape of a circle, a kidney ellipsoid or a triangle with rounded corners.

In yet another preferred embodiment, the adsorption-desorption mode used is temperature and pressure swing adsorption, the further functional module comprises a recirculating air heating apparatus and a vacuum desorption apparatus, and the conversion of the adsorption unit between the adsorption apparatus, the recirculating air heating apparatus and the vacuum desorption apparatus is implemented by means of a pipeline switching disc comprising a series of stop valves and a group of switching valves, and the adsorption unit that has completed saturated adsorption completes desorption by the dual action of the recirculating air heating apparatus and the vacuum desorption apparatus.

In still yet another preferred embodiment, the further functional module further comprises an adsorption unit storage and supply apparatus and an adsorption unit recovery apparatus; in a working process of the adsorption functional module, the adsorption unit storage and supply apparatus adds adsorption units one by one from the tail end of the adsorption series, the adsorption unit recovery apparatus recovers saturated adsorption units one by one from the head end of the adsorption series and stores the recovered saturated adsorption units in a sealed manner, regenerated adsorption units, which are generated after the saturated adsorption units stored in the sealed manner have completed a process treatment including desorption treatment in the further functional module comprising the desorption apparatus, are accommodated and stored by the adsorption unit storage and supply apparatus.

A second aspect of the present invention relates to a flue gas purification apparatus for treating flue gas containing macromolecular colloids by using an adsorption concentration method, comprising an adsorption bed for treating gas and a regeneration apparatus for regenerating an adsorbent, wherein the adsorption bed is divided into a plurality of adsorption sections along a path through which the flue gas passes, the adsorption sections are communicated in sequence and are capable of being transferred or converted between the adsorption bed and the regeneration apparatus in sequence, the adsorption section at a flue gas inlet is an initial section, the adsorption section at a flue gas outlet is a final section, a flue gas inlet end of the adsorption bed is an initial end, and a flue gas outlet of the adsorption bed is a final end.

In addition, the present invention further relates to a method for treating flue gas containing macromolecular colloids by using an adsorption concentration method, comprising the following conditions and steps:

A: a flue gas treatment apparatus used comprises an adsorption bed for treating gas and a regeneration apparatus for regenerating an adsorbent, the adsorption bed is divided into a plurality of adsorption sections along a path through which the flue gas passes, the adsorption sections are communicated in sequence and are capable of being transferred or converted between the adsorption bed and the regeneration apparatus in sequence, the adsorption section at a flue gas inlet is an initial section, the adsorption section at a flue gas outlet is a final section, a flue gas inlet end of the adsorption bed is an initial end, and a flue gas outlet end of the adsorption bed is a final end;

B: the flue gas containing the macromolecular colloids continuously passes through the adsorption bed, and is discharged from the flue gas treatment apparatus after the adsorption purification process is completed;

C: when an adsorbent surface of the initial section is covered by the macromolecular colloids to a certain extent, the adsorption section is detached from the adsorption apparatus and transferred to the regeneration apparatus for desorption treatment, and a new or regenerated adsorption section is supplemented at the final end of the adsorption bed;

D: the adsorption section that has completed adsorption and been transferred to the desorption apparatus is subjected to a normal temperature desorption treatment, and carbonization regeneration and ashing regeneration are superimposed at a desired frequency on the basis of the normal temperature desorption treatment; and E: the adsorption section that has completed the above regeneration treatment re-enters the adsorption bed.

In the above method, step E is added between step D and step F, with the following specific content: a regeneration gas passes through the adsorption section in a high-temperature state that has completed regeneration, then passes through a gas heating apparatus to raise the gas temperature to a treatment temperature used in step D, and then enters the regeneration apparatus.

According to the gas adsorption and separation apparatus of the present invention, in the operation process of the whole apparatus, which comprises an adsorption process, a desorption process and a cooling and thermal regeneration process, a continuous and complete counterflow mass and heat transfer process often adopted in the chemical engineering field and thermal engineering field is implemented through the relative movement between an adsorbent and a working gas. The low capacity of the desorption gas and the high concentration of organic pollutants also reduce the energy consumption when they are destroyed by fire power or recovered by using an agglutination method. The complete counterflow heat transfer in the thermal regeneration process reduces the heat energy that must be consumed in the thermal regeneration process of the adsorbent.

BRIEF DESCRIPTION OF THE DRAWINGS

FIG. 1 is a schematic structural diagram of a rotary adsorber.

FIG. 2 is a schematic diagram of adsorbate concentration distribution or concentration changes in a working process of a rotary adsorber and a regenerative fixed-bed adsorber.

FIG. 3 is a schematic diagram of a basic structural mode of a gas adsorption and separation apparatus according to the present invention.

FIG. 4 is a schematic diagram of a basic structural mode of a gas adsorption and separation apparatus provided with a desorption series.

FIG. 5 is a schematic diagram of a basic structural mode of a gas adsorption and separation apparatus provided with a desorption series and a thermal regeneration apparatus.

FIG. 6 is a schematic diagram of a basic structural mode of a gas adsorption and separation apparatus provided with a desorption series and a thermal regeneration series.

DETAILED DESCRIPTION OF EMBODIMENTS

Figure 7:
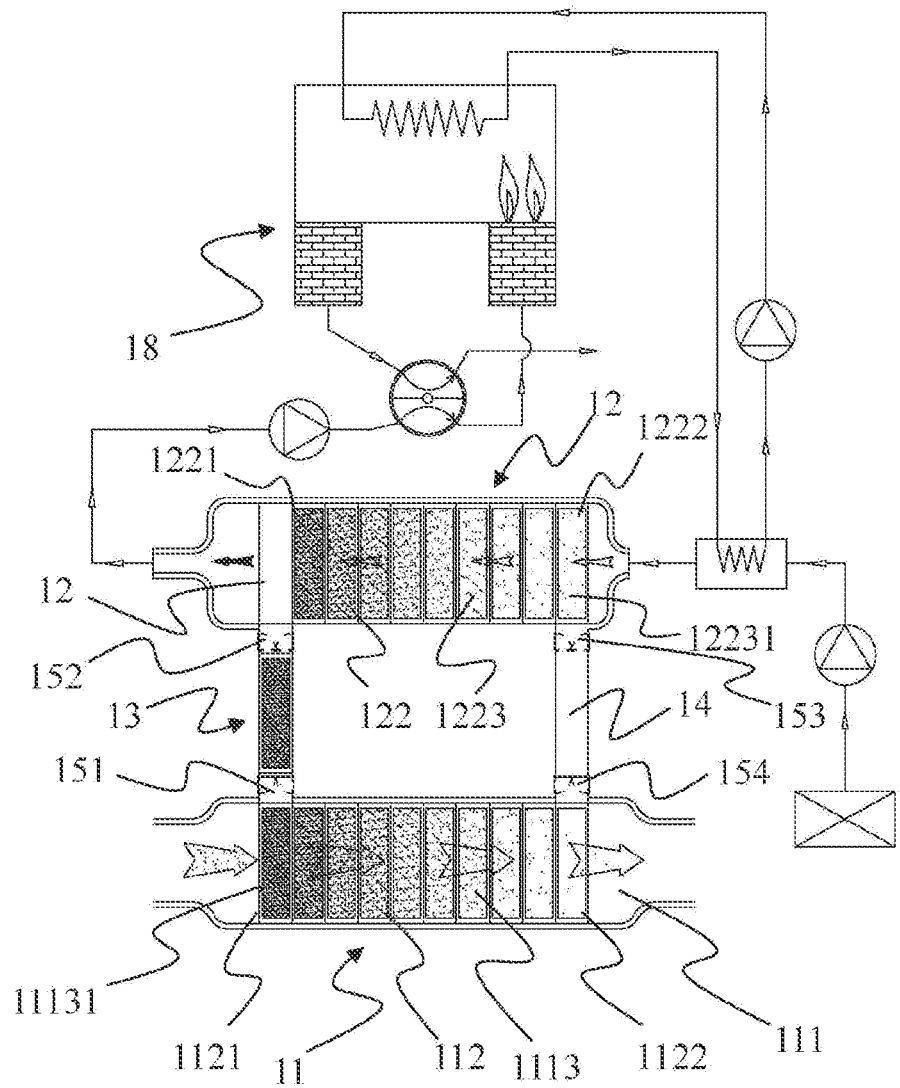
FIG. 7 is a schematic structural diagram of a gas adsorption and separation apparatus provided with a regenerative combustion and destruction apparatus and implemented by positional movement between functional modules.

Referring to FIG. 3, a basic structure of a gas adsorption and separation apparatus according to a first aspect of the present invention comprises an adsorption functional module 01 and a further functional module 02. The further functional module 02 comprises a desorption apparatus 021. A main functional portion of the adsorption functional module 01 is an adsorption series 011 composed of two or more adsorption units 09 arranged in sequence. The adsorption series 011 comprises a head end 0111 and a tail end 0112, and a gas to be separated 081 passes through the adsorption series 011 in a direction from the head end 0111 to the tail end 0112. When completing the saturated adsorption of the adsorbate gas, the adsorption unit at the head end 0111 is detached from the adsorption series 011, enters the desorption apparatus 021, and sequentially re-enters the adsorption series 011 from the tail end 0112 after the desorption treatment is completed. The adsorption unit is an adsorptive fixed bed that is composed of an adsorbent and a mechanical support structure and has a proper mechanical strength and a good permeability. The adsorption unit which has completed the saturated adsorption is referred to as a saturated adsorption unit 091, and the adsorption unit which has completed desorption and regeneration is referred to as a regenerated adsorption unit 092.

According to different specific applications, the gas adsorption and separation apparatus according to the present invention can use different adsorption-desorption modes, mainly including temperature swing adsorption, pressure swing adsorption or temperature and pressure swing adsorption. Some less commonly used modes may also be included, which are mainly reflected in the difference of desorption, such as microwave desorption, displacement desorption and extraction desorption. The so-called temperature swing adsorption refers to the concentration or separation of an adsorbate implemented by using the different adsorbate adsorption capacities of an adsorbent at different temperatures, which is generally low-temperature adsorption or high-temperature desorption. The so-called pressure swing adsorption refers to the concentration or separation of an adsorbate implemented by using different adsorbate adsorption capacities of an adsorbent under different partial pressures, which is generally high-pressure adsorption or low-pressure desorption. The so-called temperature and pressure swing adsorption is a combination of the above two, which is generally low-temperature and high-pressure adsorption or high-temperature and low-pressure desorption.

Referring to FIG. 4, when the adsorption-desorption mode of temperature swing adsorption is used, a main functional portion of the desorption apparatus 021 is a desorption series 0211 composed of two or more saturated adsorption units 091 arranged in sequence, which comprises a saturation end 02111 and a regeneration end 02112. A high-temperature desorption gas 082 passes through the desorption series 0211 in a direction from the regeneration end 02112 to the saturation end 02111 to generate a concentrated adsorbate gas 0821. After the saturated adsorption unit 091 completes desorption and regeneration, the generated regenerated adsorption unit 092 is detached from the desorption series 0211. In this way, when the high-temperature desorption gas 082 passes through the desorption series 0211, the heat carried thereby is gradually transferred to an adsorbent of an adsorption bed, the temperature of the adsorbent is gradually increased, and the adsorbate escapes and the desorption is completed.

Referring to FIGS. 5 and 6, the regenerated adsorption unit 092 that has completed desorption is in a high-temperature state, and needs to be lowered to a low-temperature state to be suitable for re-entering an adsorption state. In the gas adsorption and separation apparatus according to the present invention, a thermal regeneration apparatus 022 may be disposed in the further functional module 02. The thermal regeneration apparatus 022 functions to transfer the heat contained in the regenerated adsorption unit 092 in a high-temperature state to a source gas of the desorption gas 082, and the desorption gas 082 is generated after the heat is released from the source gas. In practical applications, a main functional portion of the thermal regeneration apparatus 022 is a thermal regeneration series 0221 composed of two or more high-temperature regenerated adsorption units 092 arranged in sequence, which comprises a hot end 02211 and a cold end 02212. The high-temperature thermally regenerated adsorption unit 092 that has completed desorption is added into the thermal regeneration series 0221 from the hot end 02211, a thermal regeneration gas 083 passes through the thermal regeneration series 0221 in a direction from the cold end 02212 to the hot end 02211 and is heated at constant temperature to generate a high-temperature desorption gas 082, which enters the desorption apparatus 021. The regenerated adsorption unit 092 that has completed heat exchange is detached from the thermal regeneration series 0221 from the cold end 02212 and re-enters the adsorption series 011 of the adsorption functional module 01. If the thermal regeneration apparatus 022 is configured to be composed of only one regenerated adsorption unit (as shown in FIG. 5), it is also feasible, but the cooling effect is poor and the thermal regeneration efficiency is low.

In the above technical solution using the temperature swing adsorption principle, in the operation process of the whole apparatus, which comprises an adsorption process, a desorption process and a cooling and thermal regeneration process, a continuous and complete counterflow mass and heat transfer process often adopted in the chemical engineering field and thermal engineering field is implemented through the relative movement between an adsorbent and a working gas. The working gas herein includes polluted air and the desorption gas. The complete counterflow mass transfer in the adsorption process is the core technical point of the present invention, so that it is ensured that the adsorption unit which has completed the adsorption and enters a desorption process is in a saturated adsorption state under the working conditions (mainly including a particle size of a granular adsorbent or a thickness of a channel spacing wall of a solid shaped adsorbent, a concentration of an adsorbate, a gas flow velocity, a temperature, etc.). Herein, "saturation" generally refers to dynamic saturation, namely a relative saturation state close to static saturation, which can be achieved under specific working conditions while working efficiency and economy are ensured. This will mainly determine the maximum concentration of the desorption gas. The complete counterflow mass and heat transfer in the desorption process ensure that the regenerated adsorption unit that has completed the desorption and is about to re-enter the adsorption process is in a fully desorbed state under the working conditions (mainly including a particle size of an adsorbent or a thickness of a channel spacing wall, and a gas flow velocity and temperature of a desorption gas), which will mainly determine the minimum emission concentration of polluted air to be treated. The low capacity of the desorption gas and the high concentration of organic pollutants also reduce the energy consumption when they are destroyed by fire power or recovered by using an agglutination method. The complete counterflow heat transfer in the thermal regeneration process reduces the heat energy that must be consumed in the thermal regeneration process of the adsorbent.

The present invention will be further explained below with reference to specific embodiments.

Embodiment 1

Figure 8:
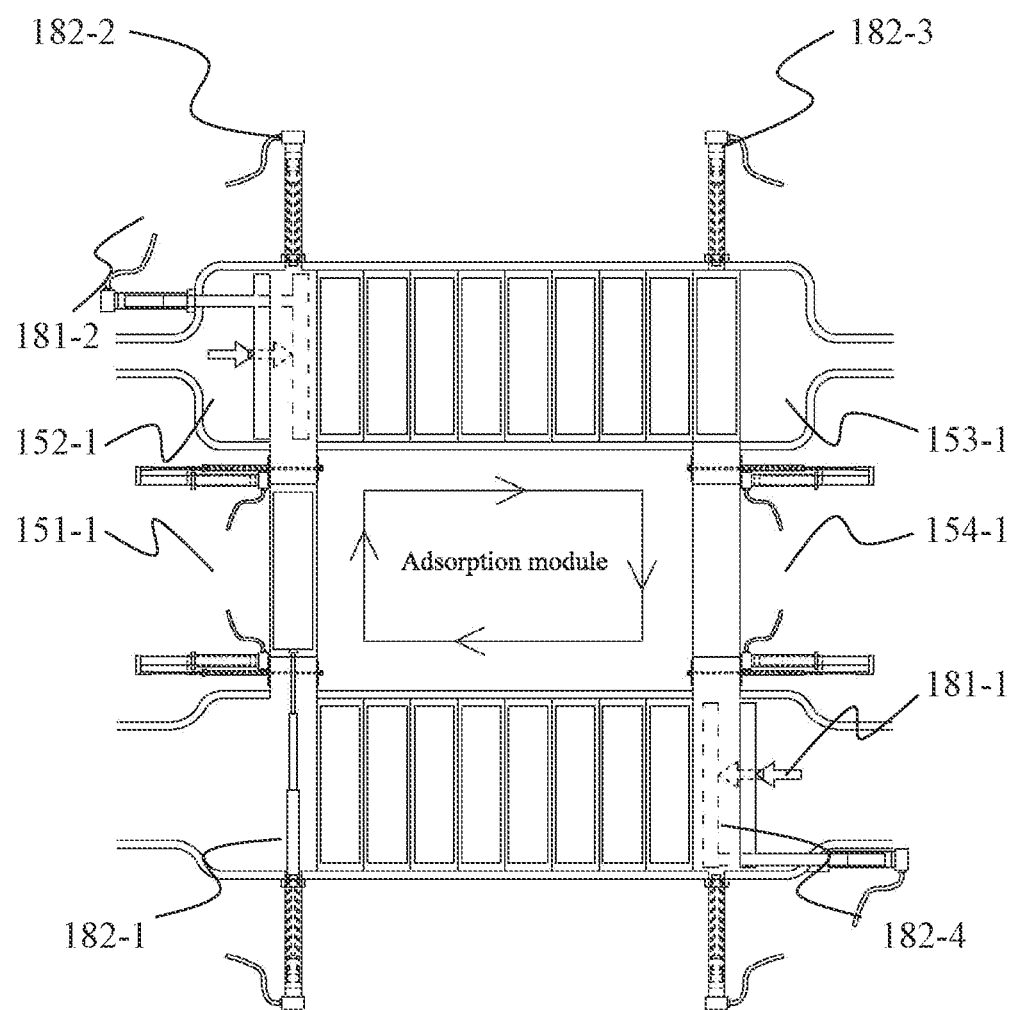
FIG. 8 is a schematic functional structural diagram of a unit moving apparatus of the gas adsorption and separation apparatus shown in FIG. 7, which implements the movement of adsorption units between the functional modules.

FIGS. 7 and 8 show a unit moving type gas adsorption and separation apparatus.

Referring to FIG. 7, the apparatus comprises an adsorption apparatus 11, a desorption apparatus 12, a saturation transition chamber 13 and a regeneration transition chamber 14. The adsorption apparatus 11 comprises an adsorption chamber 111 and an adsorption series 112 accommodated in the adsorption chamber. The adsorption series 112 comprises a head end 1121, a tail end 1122, and two or more adsorption units 1113. The unit at the head end 1121 that has completed saturated adsorption is a saturated adsorption unit 11131.

The desorption apparatus 12 comprises a desorption chamber 121 and a desorption series 122 accommodated in the desorption chamber. The desorption series 122 comprises a saturation end 1221, a regeneration end 1222 and two or more desorption units 1223. The unit at the regeneration end 1222 that has completed desorption is a regenerated adsorption unit 12231.

Two ends of the adsorption chamber 111 and two ends of the desorption chamber 121 are respectively communicated by means of the saturation transition chamber 13 and the regeneration transition chamber 14, joints therebetween are each provided with a valve for allowing the adsorption unit to pass through, and the valves are respectively identified by 151, 152, 153, 154. The saturation transition chamber 13 and the regeneration transition chamber 14 function to complete the transfer of the adsorption unit between the two chambers under the condition that the adsorption apparatus 11 and the desorption apparatus 12 keep working continuously, and to prevent polluted gases in different treatment states from being mixed between the two chambers. If an intermittent working mode is adopted, i.e., the treatment of the polluted gas is stopped when the adsorption unit is transferred, the two transition chambers can be omitted.

The adsorption and desorption of this embodiment are in the mode of temperature swing adsorption.

When the gas adsorption and separation apparatus works, the adsorption chamber 111 and the desorption chamber 121 are both filled with adsorption units, and a large flow of gas to be treated passes, from the head end 1121 to the tail end 1122 of the adsorption series 112, through the adsorption series 112 located in the adsorption chamber 111. When the adsorption unit at the head end 1121 reaches saturated adsorption, the valve 151 located between the adsorption chamber 111 and the saturation transition chamber 13 is opened, and a mechanical apparatus pushes the saturated adsorption unit 11131 into the saturation transition chamber 13. The valve 151 is then closed, and a mechanical apparatus moves the whole adsorption series toward the head end. The valve 153 between the desorption chamber 121 and the regeneration transition chamber 14 is opened, and a mechanical apparatus pushes the regenerated adsorption unit 12231 located at the regeneration end 1222 into the regeneration transition chamber 14. The valve 153 is then closed, and a mechanical apparatus moves the desorption series 122 in the desorption chamber 121 toward the regeneration end 1222, leaving the saturation end of the desorption chamber 121 vacant. The valve 152 between the saturation transition chamber 13 and the desorption chamber 121 is opened, and a mechanical apparatus pulls the saturated adsorption unit 11131 into the desorption chamber 121. The valve 154 between the saturation transition chamber 13 and the adsorption chamber 111 is opened, and a mechanical apparatus pulls the regenerated adsorption unit 12231 in the regeneration transition chamber 14 into the adsorption chamber 111. According to the above sequence, the adsorption unit moves circularly in the four chambers.

In the whole process, a small flow of high-temperature desorption gas continuously passes through the desorption series 122 located in the desorption chamber 121 from the saturation end to the regeneration end. In the gas adsorption and separation apparatus, a ratio of the flow of the gas to be treated to the flow of the high-temperature desorption gas may be 10:1-50:1 or higher. If organic pollutants contained in the high-temperature desorption gas are suitable for combustion and have low recovery value, they are generally sent to a combustion and destruction apparatus for destruction. For example, FIG. 7 shows the structure of a regenerative burner 18. According to the difference of heat value of the desorption gas and combustibility of organic matters, the combustion and destruction apparatus may also be a direct-fired burner, a catalytic burner or a regenerative catalytic burner. If the heat value of the desorption gas is high enough, the combustion and destruction process of the organic pollutants may also provide heat to the desorption gas. This is also one of the ultimate objectives of the technical improvement made to the present invention.

The transfer of the adsorption unit between the four chambers may be automatically completed by a series of commonly used power mechanical apparatuses. Referring to FIG. 8, in this embodiment, four hydraulic or pneumatic push rods may be used, wherein the push rods for pushing the adsorption unit to move in the adsorption chamber or the desorption chamber are respectively indicated by 181-1 and 181-2. Push-pull rods for pushing or pulling the adsorption unit to move between the adsorption chamber, the desorption chamber, the saturation transition chamber and the regeneration transition chamber are respectively indicated by 182-1, 182-2, 182-3 and 182-4.

In FIG. 8, the valves between the transition chambers and the adsorption chamber and the desorption chamber are schematically represented by double revolving doors. In this embodiment, hydraulic or pneumatic gate valves are actually used, which are identified by 151-1, 152-1, 153-1 and 154-1 in the figure.

Embodiment 2

Figure 9:
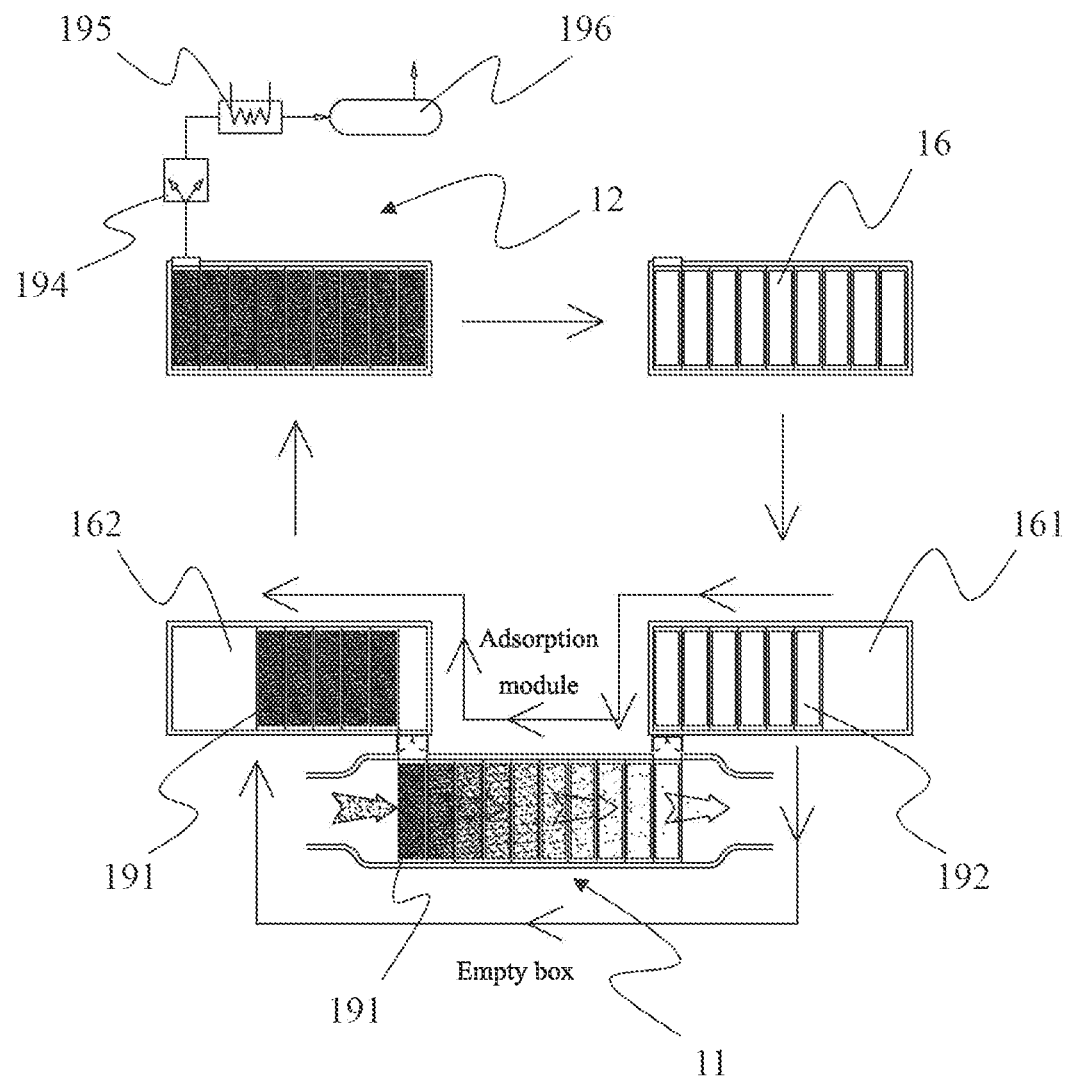
FIG. 9 is a schematic structural diagram of a gas adsorption and separation apparatus provided with an adsorption unit storage and supply apparatus, a saturated adsorption unit recovery apparatus and a reduced-pressure desorption apparatus.
Figure 10:
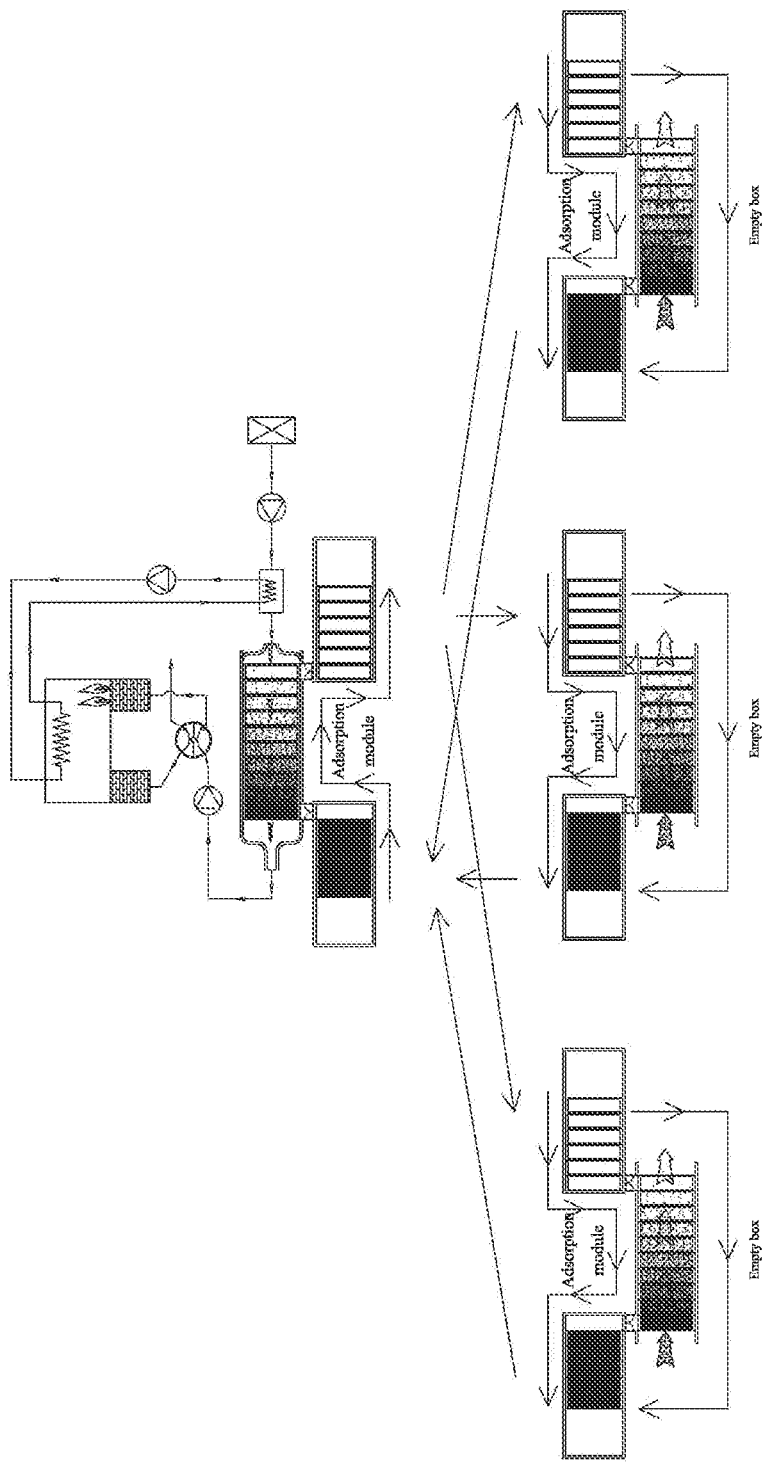
FIG. 10 is a schematic diagram of the structure and an operation mode of a gas adsorption and separation apparatus implementing centralized treatment and temperature rising desorption.

FIGS. 9 and 10 show a unit supply and recovery type gas adsorption and separation apparatus.

One of the important conditions for the specific application of the gas adsorption and separation apparatus shown in Embodiment 2 is that the flow rate of waste gas to be treated and the concentration of organic pollutants are substantially stable, because thermal desorption needs to use the organic pollutants in the waste gas as heating fuel to keep a substantially stable high-temperature environment. If the waste gas is discharged intermittently or the flow rate and the concentration fluctuate greatly, a de-adsorption process will be adversely affected, and it is generally necessary to add additional supplementary fuel. The unit supply and recovery type gas adsorption and separation apparatus disclosed in Embodiment 2 can adapt to this situation very well.

The specific solution of the unit supply and recovery type gas adsorption and separation apparatus is that an adsorption apparatus 11 and a desorption apparatus 12 of the gas adsorption and separation apparatus are separated into two independent portions, and an adsorption unit turnover apparatus 16 is added, comprising an adsorption unit supply apparatus 161 and an adsorption unit recovery apparatus 162. For the mechanical structure of the unit turnover apparatus 16, reference can be made to a magazine structure of a firearm that can fire continuously. A saturated adsorption unit 191, which is located at a head end of an adsorption series in the adsorption apparatus 11 and has completed saturated adsorption, is moved, by using a mechanical apparatus, into the sealed adsorption unit recovery apparatus 162 connected to an adsorption chamber via a valve, and a new or regenerated adsorption unit 192 is supplemented to the adsorption chamber from the adsorption unit supply apparatus 161 connected to the adsorption chamber via a valve. After being filled with saturated adsorption units, the adsorption unit recovery apparatus is moved to the separate desorption apparatus 12 for performing desorption treatment on the saturated adsorption units. A de-adsorption apparatus may be connected to a vacuum pump 194, a compression condensation apparatus 195 and a storage apparatus 196 to recover the separated organic pollutants, as shown in FIG. 9. Adsorption unit recovery apparatuses filled with saturated adsorption units and generated by a plurality of gas adsorption apparatuses may also be concentrated at one desorption apparatus, to perform desorption treatment continuously by thermal desorption, as shown in FIG. 10. In a word, the desorption apparatus may use any suitable desorption methods including thermal desorption, reduced-pressure desorption, thermal reduced-pressure desorption, displacement desorption, etc.

Embodiment 3

Figure 11:
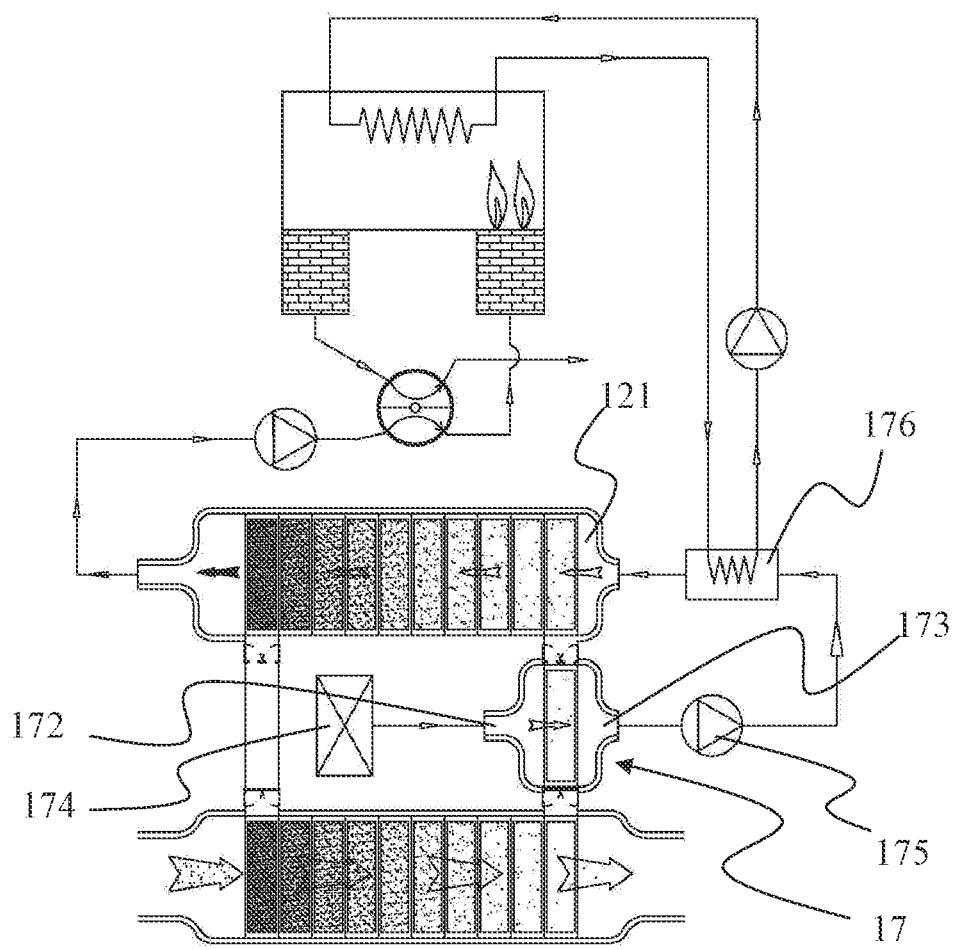
FIG. 11 is a schematic structural diagram of a gas adsorption and separation apparatus provided with a thermal regeneration apparatus.
Figure 12:
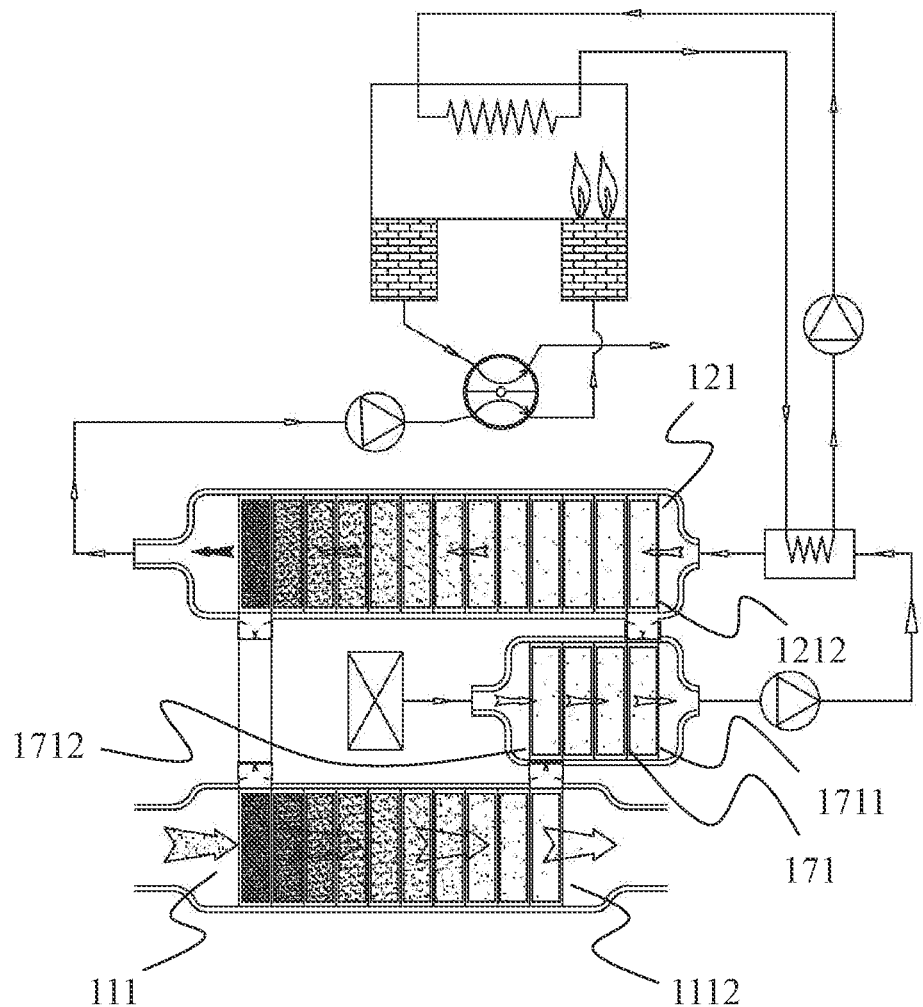
FIG. 12 shows the apparatus shown in FIG. 11 with a thermal regeneration series replacing the thermal regeneration apparatus.

FIGS. 11 and 12 show an apparatus for adsorption and separation of a thermal regeneration gas.

In the gas adsorption and separation apparatus shown in Embodiment 1, the regenerated adsorption unit that has completed desorption is still in a high-temperature state when it enters the regeneration chamber through the transition chamber and is added to the adsorption series. Although a large flow of polluted air which has been substantially adsorbed quickly takes away its heat and there is no significant impact on the adsorption process, the loss of heat energy of the system is caused. This has a certain negative impact on reduction of energy consumption, which is one of the original purposes of the apparatus according to the invention.

The technical solution to overcome this technical disadvantage is to replace the regeneration transition chamber 14 in Embodiment 1 with a thermal regeneration apparatus 17, and transfer, to the adsorption series, the heat contained in the high-temperature regenerated adsorption unit and carried by a regeneration gas, as shown in FIG. 10. Specifically, an air inlet 172 and an air outlet 173 are respectively arranged on left and right sides of the transition chamber. Air filtered by an air filter 174 passes through regenerated adsorption units located in the thermal regeneration apparatus 17, is then pressurized by a fan 175 and heated by a heat exchanger 176, and enters the desorption chamber 121.

Referring to FIG. 11, in order to further improve the thermal regeneration efficiency of the thermal regeneration apparatus, a thermal regeneration series 171 may be provided in the thermal regeneration apparatus. The thermal regeneration series 171 comprises two or more regenerated adsorption units, and comprises a hot end 1711 and a cold end 1712. The hot end 1711 is communicated with a regeneration end 1212 of the desorption chamber 121 through a valve. The cold end 1712 is communicated with a tail end 1112 of the adsorption chamber 111 through a valve.

For a motion transmission mode of the adsorption unit, reference can be made to Embodiment 1.

Embodiment 4

Figure 13:
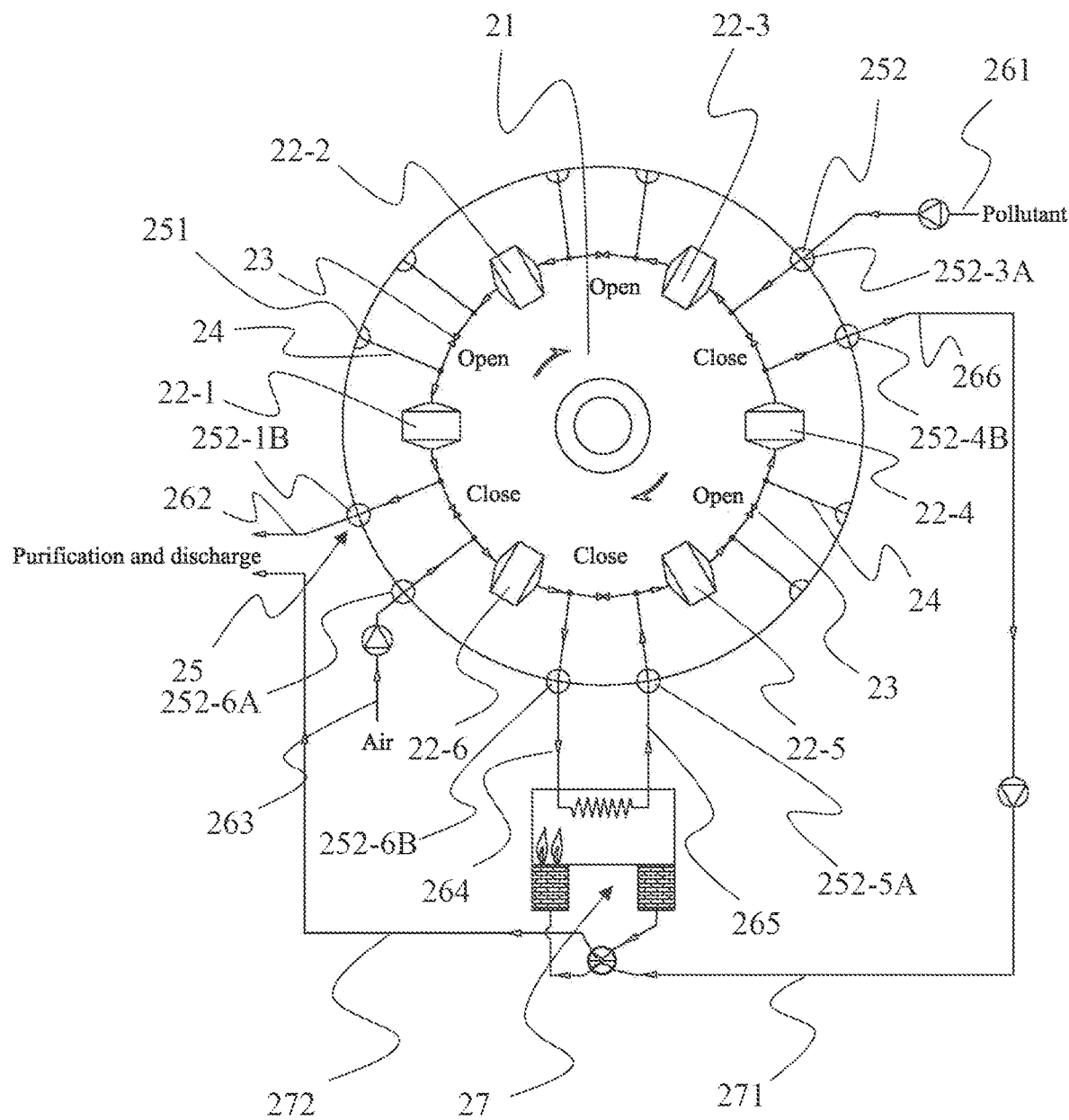
FIG. 13 is a schematic structural diagram of a gas adsorption and separation apparatus implemented through a pipeline switching disc, wherein a temperature swing adsorption principle is used.

FIG. 13 shows a rotating disc type gas adsorption and separation apparatus using temperature swing adsorption.

In this embodiment, a set of pipeline switching disks and a series of stop valves are used instead of the adsorption unit transferring mechanical apparatuses in Embodiment 3, and can also implement the saturated adsorption of air pollutants, as well as a complete counterflow mass and heat transfer process between an adsorbent and a working gas in an adsorption series and a de-adsorption series, and if necessary, also in a thermal regeneration series.

The apparatus comprises a rotating base 21 which can rotate intermittently under the driving of power, with the rotating direction clockwise. It is stipulated that relative to a certain point on the disc, another point in the clockwise direction is on a forward side, and another point in the anticlockwise direction is on a reverse side. Six fixed-bed adsorbers 22-1, 22-2, 22-3, 22-4, 22-5 and 22-6 are fixed on the rotating base 21 in a central symmetry manner, and are communicated through pipelines to form a closed ring. A stop valve 23 which can be automatically controlled to be opened or closed is arranged in the middle of each pipeline connecting the fixed-bed adsorbers, and two ends on the forward side and the reverse side of each fixed-bed adsorber are each provided with a switching tube 24 leading to a periphery of the rotating base 21, so that there are twelve switching tubes in total. An outer end of the switching tube 24 is provided with a rotating portion 251 of a switching stop valve. Six fixed portions 252 of switching stop valves, which are fixed to the ground, are provided outside the rotating base 21. A complete switching stop valve 25 composed of the rotating portion 251 and the fixed portion 252 has two functions: rotary switching and cut-off/opening, and can be replaced by the independent stop valve arranged on the rotating base and the switching valve composed of two portions respectively arranged on the rotating base and the ground. For the structure of a rotary valve, reference can be made to a commercially available rotary four-way diversion valve. The difference is that the switching between four passages is changed to the switching of multiple passages. When the rotating portion rotates such that no fixed portion corresponds thereto, it is equivalent to that there is a blocking apparatus at the position of the fixed portion to block the rotating portion.

The six fixed-bed adsorbers are divided into three groups, which are an adsorption group 22-1, 22-2 and 22-3, a desorption group 22-4 and 22-5, and a thermal regeneration group 22-6. The serial number of the fixed portion 252 of the switching stop valve corresponds to the serial number of the fixed-bed adsorber, and its forward side is numbered as 252-XA while its reverse side is numbered as 252-XB, wherein X is the sequence number of the fixed-bed adsorber. A polluted air supply pipe 261 is communicated with a fixed portion 252-3A of a switching stop valve, a treated polluted air discharge pipe 262 is communicated with a fixed portion 252-1B of a switching stop valve, a regeneration air supply pipe 263 is communicated with a fixed portion 252-6A of a switching stop valve, an extraction end and an input end 264, 265 of a desorption air heating pipe are respectively communicated with a fixed portion 252-6B of the switching stop valve and a fixed portion 252-5A of a switching stop valve, and a desorption gas discharge pipe 266 is communicated with a fixed portion 252-4B of a switching stop valve. A total of three stop valves between three fixed-bed adsorbers in the adsorption group and between two fixed-bed adsorbers in the desorption group are opened, and three stop valves between the remaining groups are closed. The desorption gas discharge pipe is communicated with an intake pipe 271 of a regenerative combustion furnace 27, and a flue gas discharge pipe 272 of the regenerative combustion furnace 27 and the treated polluted air discharge pipe 262 are in parallel flow communication with a chimney (not shown).

During working, polluted air enters from the polluted air supply pipe 261, sequentially passes through the three fixed-bed adsorbers 22-3, 22-2 and 22-1 of the adsorption group, and is discharged from the discharge pipe of polluted air 262 after being treated. Regeneration air enters from the regeneration air supply pipe 263, passes through the fixed-bed adsorber 22-6 of the thermal regeneration group, is heated by the regenerative combustion furnace 27, then passes through the fixed-bed adsorbers 22-5 and 22-4 of the desorption group, is discharged from the desorption gas discharge pipe 266 and is introduced into the regenerative combustion furnace 27, organic pollutants carried therein are burned and destructed, and the regeneration air passes through the flue gas discharge pipe 272 and flows through the chimney with the treated polluted air into upper atmosphere. In operation, every time a certain operation time is elapsed or the apparatus receives a certain amount of organic pollutants so that the adsorption capacity of the fixed-bed adsorber 22-3 is saturated, the rotating base 21 rotates by 60°, and the adsorbers are regrouped.

One fixed-bed adsorber completes the whole treatment cycle through six-step conversion, and the time between every two adjacent conversion actions is referred to as a treatment interval.

After entering the adsorption series, the fixed-bed adsorber moves from the tail end to the head end of the adsorption series through two treatment intervals and two conversions, then completes saturated adsorption through one treatment interval, enters a saturation end of a temperature rising desorption series after the third conversion, runs to a regeneration end of the temperature rising desorption series through the fourth conversion after one treatment interval, and then switches to a thermal regeneration interval through the fifth conversion after one treatment interval, there is only one thermal regeneration interval, and upon completion, the fixed-bed adsorber is converted again to enter the next cycle.

Embodiment 5

Figure 14:
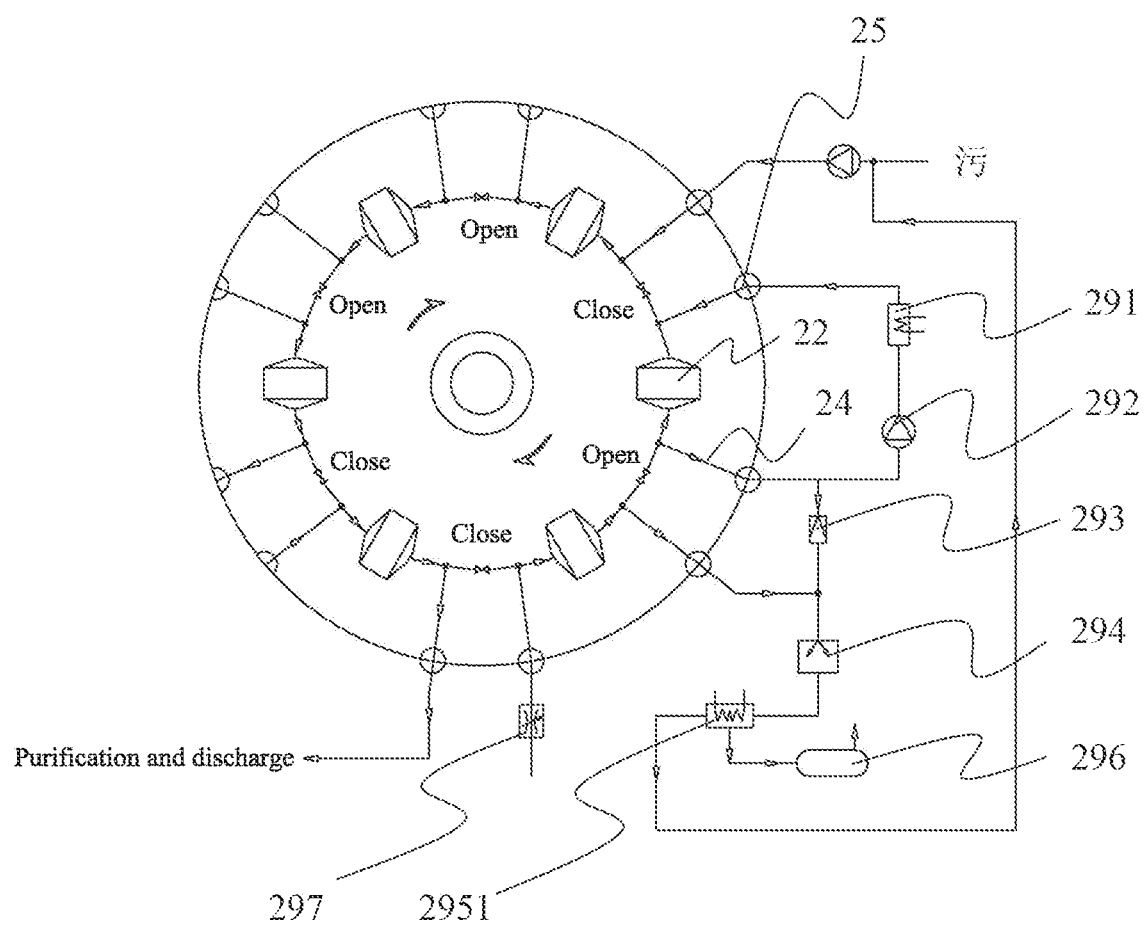
FIG. 14 is a schematic structural diagram of a gas adsorption and separation apparatus implemented through a pipeline switching disc, wherein a temperature and pressure swing adsorption principle is used.

FIG. 14 shows a rotating disc type gas adsorption and separation apparatus using temperature swing adsorption.

The rotating disc type gas adsorption and separation apparatus using temperature swing adsorption as shown in Embodiment 4 has its limitations in the following two specific applications:

I. Polluted air contains organic pollutant gases which should not be destructed by combustion, for example, polluted air contains more sulfur, phosphorus, halogen or contains benzene ring and chlorine at the same time, so that secondary pollutants will be generated after these gases are combusted.

II. Pollutants contain a sufficient amount of high-value organic pollutant gases, which have recovery value.

This embodiment discloses a gas adsorption and recovery apparatus which eliminates air pollution and recovers organic pollutants by using a temperature and pressure swing adsorption method.

An adsorption group of polluted air in this apparatus is similar to the apparatus shown in Embodiment 4, with only one treatment interval added. The apparatus mainly differs in that the thermal regeneration group is omitted, and the functional setting of a ground fixing apparatus in a desorption interval is changed. The desorption group of the apparatus comprises two treatment intervals: a recirculating air heating interval and a vacuum desorption interval. An apparatus corresponding to the recirculating air heating interval comprises a hot blast stove 291, a fan 292 and a pressure reducing valve 293. The ground fixing apparatus corresponding to the vacuum desorption interval comprises a throttle valve 297, a vacuum pump 294, a condenser 2951 and a liquid storage tank 296.

Two ends of the hot blast stove 291 and the fan 292 connected in series are respectively communicated with switching tubes 24 at two ends of a fixed-bed adsorber 22 in the recirculating air heating interval through switching stop valves 25. The vacuum pump 294 and the throttle valve 297 are respectively communicated with switching tubes 24 at two ends of a fixed-bed adsorber 22 in the vacuum desorption interval through switching stop valves 25. The pressure reducing valve 293 is communicated with a pipeline between the recirculating air heating interval and the vacuum desorption interval. The condenser 295 and the liquid storage tank 296 are sequentially connected behind the vacuum pump. A liquid discharge port of the condenser 295 is connected to the liquid storage tank 296, and a condensed gas discharge port is communicated with the polluted air supply pipe 261.

After completing saturated adsorption, the fixed-bed adsorber rotates to the recirculating air heating interval, and is heated by means of the hot blast stove and the fan, so that the temperature of the adsorption bed gradually rises; the organic pollutant gas released by the adsorbent and gas thermally expand together to have a tendency to increase the gas pressure in the pipeline; and the gases are depressurized through the pressure reducing valve and then enter the vacuum pump together with the gas discharged by the fixed-bed adsorber in the vacuum desorption interval. After completing recirculating air heating, the fixed-bed adsorber rotates to the vacuum desorption interval and continues to release organic pollutant gas under the low pressure caused by the vacuum pump, and when vacuum desorption is nearly completed, a small amount of air is controllably input through the throttle valve to further flush out the remaining organic pollutant gas. Organic pollutant liquid is separated through the condenser from the mixed gas containing the organic pollutant gas and discharged by the vacuum pump, and flows into the liquid storage tank for collection and storage. There may be a small amount of organic pollutants in the condensed gas discharged from the condenser, which will be incorporated into a polluted air input pipe for cyclic adsorption and purification.

The specific application of the present invention is to treat flue gas containing macromolecular colloids by the gas adsorption and separation apparatus according to the present invention using the adsorption concentration method.

Staged adsorption beds are used in the adsorption concentration method: A flue gas treatment apparatus used comprises an adsorption bed for treating gas and a regeneration apparatus for regenerating an adsorbent, the adsorption bed is divided into a plurality of adsorption sections along a path through which the flue gas passes, the adsorption sections are communicated in sequence and are capable of being transferred or converted between the adsorption bed and the regeneration apparatus in sequence, the adsorption section at a flue gas inlet is an initial section, the adsorption section at a flue gas outlet is a final section, a flue gas inlet end of the adsorption bed is an initial end, and a flue gas outlet end of the adsorption bed is a final end.

When an adsorbent surface of the initial section is covered by the macromolecular colloids to a certain extent, the adsorption section is detached from the adsorption apparatus and transferred to the desorption apparatus for desorption treatment, and a new or regenerated adsorption section is supplemented at the final end of the adsorption bed.

The adsorption section that has completed adsorption and been transferred to the desorption apparatus is subjected to a normal temperature desorption treatment, and carbonization regeneration and ashing regeneration are superimposed at a desired frequency on the basis of the normal temperature desorption treatment.

Before entering the adsorption bed, the flue gas is pretreated by using a filtration and condensation surface adsorber. The filtration and condensation surface adsorber may be arranged at an inlet of a flue gas collection pipeline. The filtration and condensation surface adsorber is made of a high-temperature-resistant material. The flue gas collection pipeline may be provided with a lining made of a high-temperature-resistant and heat-insulating material. The flue gas collection pipeline is configured as a structure capable of forming an annular pipeline.

The filtration and condensation surface adsorber, the flue gas collection pipeline and the adsorption bed use the combination of a common high-temperature desorption method and a controlled carbonization and ashing method to remove condensed and adsorbed macromolecular colloids.

The key of the technical meaning of the controlled carbonization and ashing method is to avoid local high-temperature damage to the filtration and condensation surface adsorber, the flue gas collection pipeline and the adsorption bed. The specific approach may be to use slow heating of hot air or rapid inert gas heating combined with delayed and slow addition of controlled oxidation gas.

The treatment method will be described in detail below.

The adsorption concentration method is a commonly used method for treating VOC waste gas with a low concentration and a large air volume in the field of waste gas treatment. According to the working principle, the adsorption concentration method may be divided into pressure swing adsorption, temperature swing adsorption and a combination thereof. The present invention mainly uses the principle of temperature swing adsorption. The action process includes an adsorption process and a desorption process. In the adsorption process, the adsorbent selectively absorbs VOC components in the waste gas, and may also absorb some water vapor components and a small amount of other gas components, wherein other main components in the waste gas are discharged into the atmosphere as purified clean tail gas.

In the desorption process, the temperature of the adsorbent is increased by heating (generally using hot steam, hot air or hot inert gas), and the VOC components absorbed in the adsorption process are released. Generally, the VOC concentration of the concentrated waste gas generated by desorption is 10 to 30 times that of source waste gas.

The casting flue gas and similar industrial waste gas to be treated according to the present invention contain macromolecular high-boiling organic components, which will be deposited on the surface of adsorbent particles or large pores in the form of colloids during the adsorption process, thereby preventing the adsorbent from adsorbing macromolecular malodorous gas molecules from the waste gas. In the desorption process at normal temperature, these macromolecular high-boiling organic matters cannot be completely volatilized and removed. If a higher desorption temperature is used, for example, if a carbonization temperature of 400-500° C. can be reached, some of these macromolecular high-boiling organic matters will generate coke or deposited carbon which is more resistant to high temperature. After several adsorption-desorption cycles, the coke or deposited carbon will cover the adsorbent surface and block pore channels of the adsorbent, resulting in a serious degrade of the adsorption capacity of the adsorbent.

The coke or deposited carbon may be treated with a higher ashing temperature, but the existing conventional adsorption and concentration apparatus does not support operation at a higher temperature. Reluctantly using higher-grade high-temperature-resistant materials to transform devices according to the existing structure also makes manufacturing costs and operating costs of the devices commercially unacceptable.

According to the casting flue gas treatment method and the corresponding apparatus of the present invention, a perfect solution is put forward against these problems.

The adsorption bed for treating gas is divided into a plurality of adsorption sections along a path through which the gas passes, and the adsorption sections can be transferred or converted between the adsorption bed and the desorption apparatus in sequence, the adsorption section at a flue gas inlet is an initial section, the adsorption section at a flue gas outlet is a final section, a flue gas inlet end of the adsorption bed is an initial end, and a flue gas outlet end of the adsorption bed is a final end.

When an adsorbent surface of the initial section is covered by the macromolecular colloids to a certain extent, this section of the adsorption bed is detached from the adsorption bed and transferred to the desorption apparatus for desorption treatment, and a new or regenerated adsorption section is supplemented at the final end of the adsorption bed.

Herein, the term "to a certain extent" means that in specific applications, if the content of macromolecular colloids in the flue gas entering the adsorption apparatus is higher and the content of micromolecular malodorous components is lower, "to a certain degree" means that the degree to which an adsorbent surface of the initial section is covered by the macromolecular colloids is more serious. In contrast, if the content of micromolecular malodorous components is higher and they easily penetrate the whole adsorption bed when passing through the adsorption apparatus, "to a certain degree" means that the degree to which an adsorbent surface of the initial section is covered by the macromolecular colloids is controlled to be a slight degree.

Desorption treatment comprises normal temperature desorption, and carbonization regeneration and ashing regeneration superimposed based on this.

The meaning of the term "superimposed" is to continue, upon the completion of the normal temperature desorption, to raise the temperature to the carbonization temperature or the ashing temperature and keep it for a necessary duration. According to the coking degree of the adsorbent after the normal temperature desorption, one carbonization regeneration may be superimposed after the normal temperature desorption is performed every time or several times. In the same way, according to the degree of carbon deposition of the adsorbent after carbonization regeneration, one ashing regeneration is superimposed after the carbonization regeneration is performed every time or several times. Carbonization regeneration may be carried out in an oxidizing atmosphere or in an inert gas atmosphere. Ashing regeneration can only be carried out in the oxidizing atmosphere.

The term "inert gas" is a non-combustion-supporting gas including nitrogen, carbon dioxide, etc., which does not undergo oxidation reaction with macromolecular organic matters causing combustion. It is different from the concept of chemical group zero element gas such as helium. The carbonization temperature is defined herein as 350-550° C., and the ashing temperature is 550-825° C. The adsorbent used in the adsorption bed and related pipeline apparatuses need to withstand the above temperatures. During operation, the temperature of the adsorption bed should be controlled below the temperature tolerable by the adsorbent and related pipeline apparatuses.

Compared with the existing rotary adsorbers or regenerative fixed-bed adsorbers which desorb a whole bed layer of the adsorption bed during desorption, the staged high-temperature desorption method and the corresponding apparatus have the advantages that only the initial section of the adsorption bed with more macromolecular organic matters is subjected to high-temperature desorption and high-temperature regeneration, which can reduce the size of a high-temperature-resistant portion of a treatment apparatus, reduce the manufacturing cost of the apparatus and fuel consumption, also reduce the number of high-temperature heatings of the adsorbent, and relatively prolong the service life of the adsorbent. This is because the deposition site of the macromolecular organic matters in the adsorption bed is mainly concentrated in the initial section of the staged adsorption bed and they are mainly deposited on the surface of the adsorbent. In the process of moving from the final end to the initial end of the adsorption bed, the adsorption section first adsorbs the malodorous gas components which are difficult to adsorb by the adsorbent, and finally utilizes its surface to adsorb macromolecular organic matters, thereby making full use of the adsorption capacity of adsorption to different malodorous gas components of flue gas.

In order to reduce the amount of macromolecular organic matters entering the adsorption apparatus, a filtration and condensation surface adsorber may be provided on a flue gas collection pipeline.

The filtration and condensation surface adsorber may also be arranged at a pouring operation point created for each flue gas in the flue gas collection pipeline and an inlet arranged at a casting cooling and conveying channel. This can solve the problem of fires caused by the dripping of the macromolecular colloids. Two layers of filtration and condensation surface adsorbers may be provided, the significance of which will be explained later.

The filtration and condensation surface adsorber may be made of a high-temperature-resistant inorganic filter material and a supporting frame, and a filter may be specifically made of stainless steel wires, glass fibers, ceramic fibers and a combination thereof. The advantages of using this kind of material include that it is not easy to ignite after absorbing macromolecular organic matters, and it can be treated by the controlled carbonization and ashing method to remove condensed and adsorbed macromolecular colloids.

The specific method is to place the filtration and condensation surface adsorber in a high-temperature-resistant sealed space, and heat the adsorber with an inert high-temperature gas, so that the macromolecular organic matters adsorbed therein volatilize and are taken away by a gas flow to a combustion apparatus for destruction. The non-volatile part will be carbonized at a high temperature, and then the temperature of the inert high-temperature gas will continue to rise, and oxygen component will be added controllably to remove coked or carbonized macromolecular organic residues from the filter.

In theory, air may also be used in the above process, but it is not easy to control the temperature rising process, which easily causes local temperature to rise too fast and forms local hot spots, leading to the problems such as spontaneous combustion of macromolecular accumulations and the damage to the filtration and condensation surface adsorber and conveying pipelines and devices.

The positive significance of a regenerative furnace of the filtration and condensation surface adsorber is that it can avoid the replacement cost of a filler of the filtration and condensation surface adsorber and secondary pollution to the environment.

It is easy to understand the filtration and condensation of macromolecular colloids by the filtration and condensation surface adsorber. After leaving from the high-temperature environment of a casting mold, most of the macromolecular organic matters are rapidly cooled into a liquid state in the air, and some of them are condensed into visible smoke droplets, which are easily captured when passing through the filter, while the remaining exists in the form of invisible micro-droplets or dispersed molecules, which can easily pass through the filter. The capture of this part of macromolecular organic matters by the filter requires the affinity between the filter surface and these macromolecular organic matters, which is actually the surface adsorption capacity. The more the surface chemical properties of the filter material similar to those of these macromolecular organic matters, the stronger the surface adsorption capacity. However, due to the consideration of the regeneration capacity of the filter, the filter cannot be made of an organic material that is not resistant to high temperatures. The alternative is to rely on the slow deposition of the flue gas on the surface of the filter material as the flue gas passes through the filter material. When the deposition covers the surface of the filter material, the surface becomes an excellent adsorption surface. However, when the macromolecular organic matters are excessively deposited, it will cause blockage of the filter and easily cause fire.

The purpose of providing two or more separable layers of filtration apparatuses is that only a surface filtration apparatus with excessively deposited macromolecular organic matters can be removed, a deep filtration apparatus with proper deposition is reserved and replaces the surface layer, and a new or regenerated filtration apparatus is installed at the deep filtration position.

Although the filtration and condensation surface adsorber is provided in flue gas collection lines, some macromolecular organic matters still pass through and are accumulates in the pipeline. In order to prevent their excessive accumulation, the flue gas collection pipeline may be configured as a structure capable of forming an annular pipeline, a lining made of a high-temperature-resistant and heat-insulating material is provided in a pipeline chamber, and macromolecular colloids in the pipeline are removed by using a method similar to that of treating the filtration and condensation surface adsorber.

The above applications will be further explained below with reference to embodiments.

Embodiment 6: Apparatus for Staged Adsorption and Separation of Casting Flue Gas Referring to FIG. 15, the apparatus comprises an adsorption bed C and a regeneration apparatus D. The adsorption bed C comprises an initial end C1 and a final end C2. The adsorption bed C is divided into a plurality of separate adsorption sections X, the adsorption section at the initial end is referred to as an initial section CX1, and the adsorption section at the final end is referred to as a final section CX2.

The regeneration apparatus D comprises a regeneration end D1 and a concentration end D2. The regeneration apparatus D of the adsorption bed C forms an annular structure with two notches, and the initial end C1 of the adsorption bed C is adjacent to the concentration end D2 of the regeneration apparatus D. Under the driving of power, the adsorption sections X constituting the annular structure move intermittently in an annular track in sequence in the direction indicated by a hollow curved arrow, and complete the conversion between the regeneration apparatus D and the adsorption bed C through marshaling changes.

Figure 16:
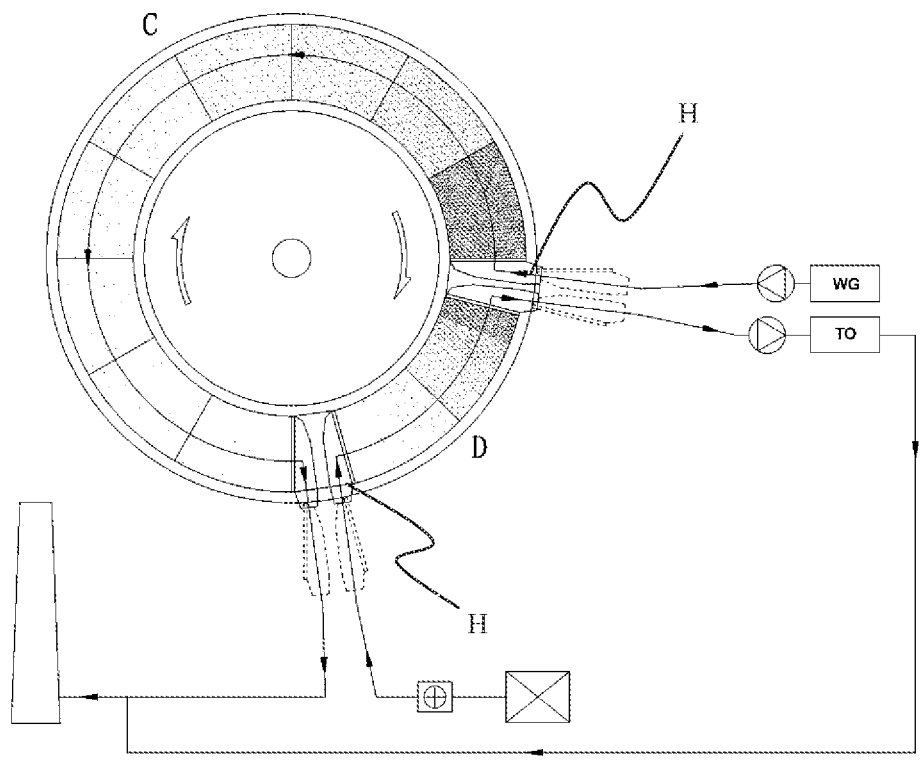
FIG. 16 shows cooperation action between an adsorption section and a movable communication pipeline interface when the adsorption section is converted between an adsorption bed and a desorption apparatus as shown in FIG. 15.

Referring to FIG. 16, the adsorption bed C and the regeneration apparatus D are each provided with a movable pipeline communication interface H. When the marshaling of the adsorption sections is changed, these movable interfaces H are detached from the connected adsorption bed C and regeneration apparatus D and moved out of the track positions, and the original connection is restored after the marshaling of the adsorption sections is completed.

The concept of marshaling refers to the operation mode of trains.

Figure 15:
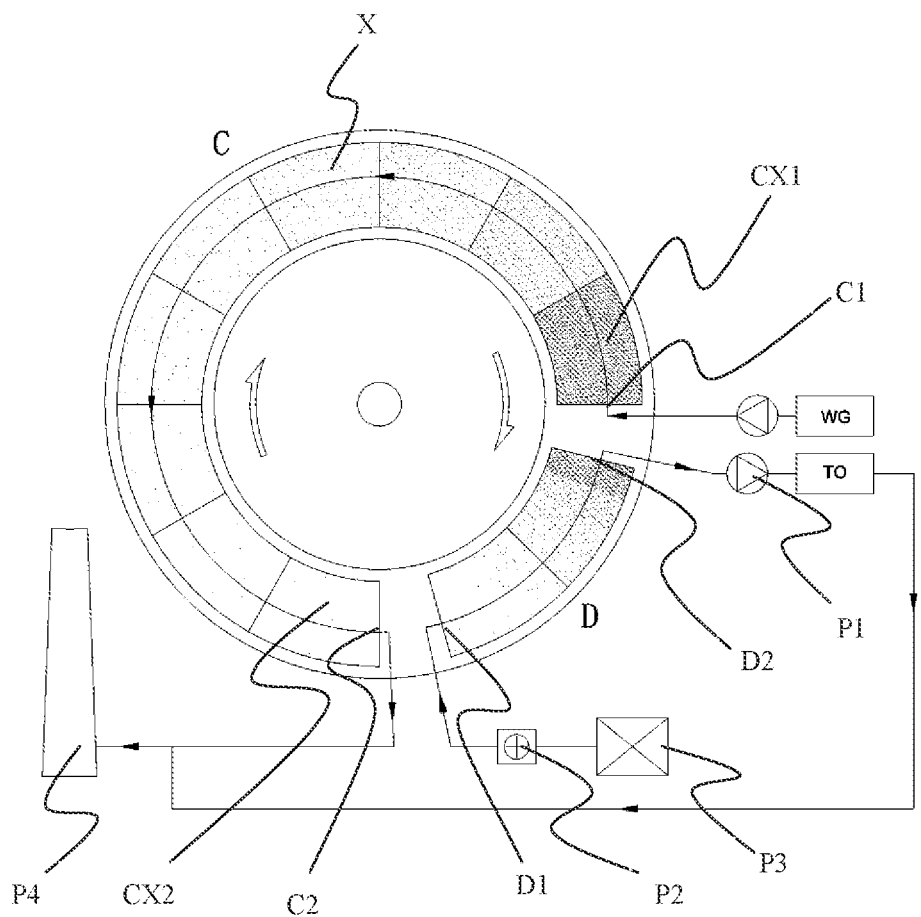
FIG. 15 is a schematic structural diagram of an apparatus for staged adsorption and separation of casting flue gas according to the present invention.

Referring to FIGS. 15 and 16, when the apparatus works, flue gas containing VOCs is introduced from the initial end C1 and is discharged from the final end C2, and the high-temperature desorption gas is introduced from the regeneration end D1 and is discharged from the concentration end D2. Peripheral devices connected to the apparatus include a source polluted air conveying pipeline WG, a fan P1, a VOC thermal destruction apparatus TO, a gas heating apparatus P2, a desorption gas supply apparatus P3 and a flue gas discharge chimney P4, which are the same as those of a common VOC concentration apparatus using temperature swing adsorption.

Embodiment 7: An Apparatus for Staged Adsorption and Separation of Casting Flue Gas Provided with a Heat Recovery Apparatus is Described Referring to FIGS. 17-19, on the basis of Embodiment 6, a heat recovery apparatus E is added between the final end of the adsorption bed C and the regeneration end of the regeneration apparatus D, and includes a cold end E1 adjacent to the final end C2 of the adsorption bed C and a hot end E2 adjacent to the regeneration end D1 of the regeneration apparatus D, and also includes a plurality of adsorption sections X. A desorption gas enters the heat recovery apparatus E from the cold end E1 and is discharged from the hot end E2, is heated to a desorption temperature by the gas heating apparatus P2 and then enters the regeneration apparatus D. After improvement, the movement and a marshaling change mode of the adsorption sections are similar to those of Embodiment 6.

The positive effect of Embodiment 7 is that heat contained in the adsorbent in a high-temperature state that has completed desorption can be recovered, and the residual organic pollutant gas can be further flushed in the cooling process.

Figure 17:
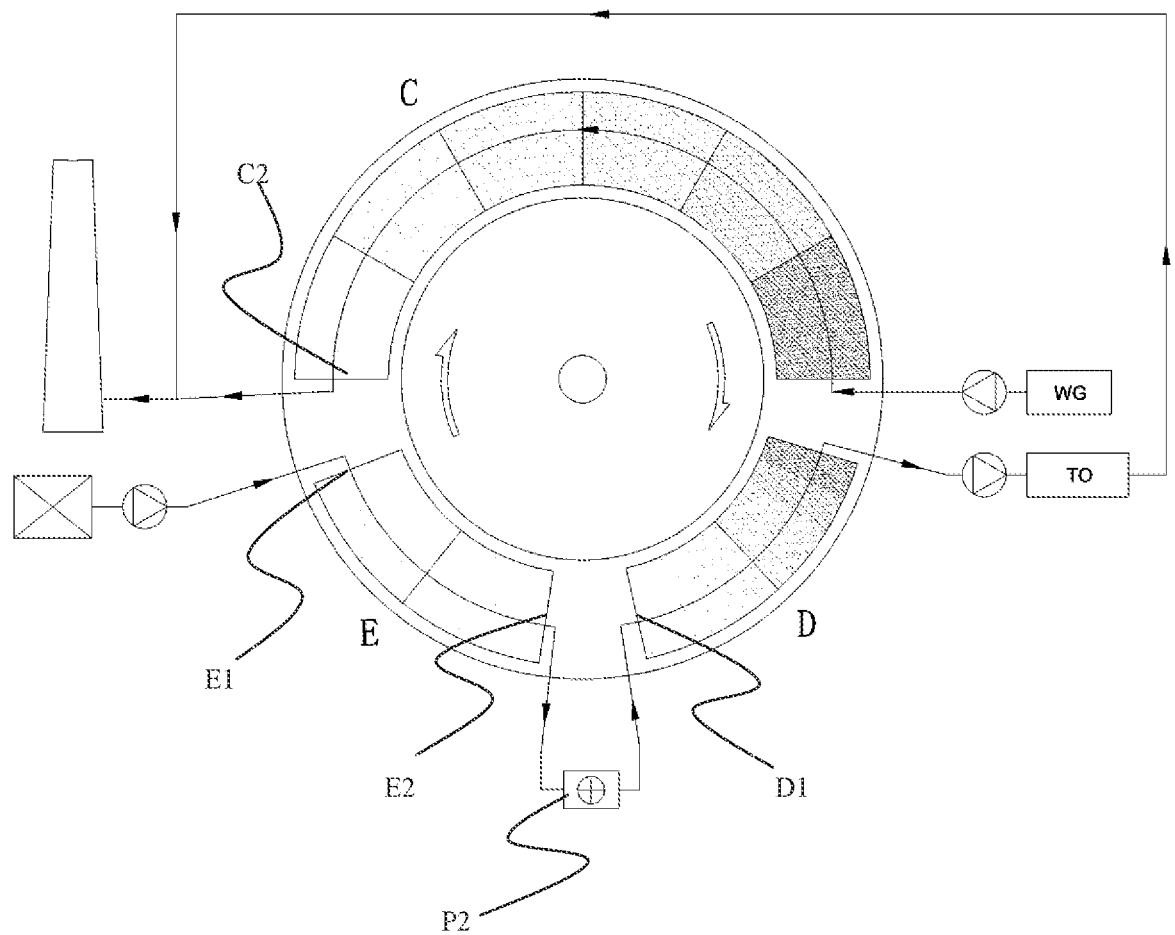
FIG. 17 is a schematic structural diagram of an apparatus for staged adsorption and separation of casting flue gas, which is provided with a heat recovery apparatus.

FIG. 17 illustrates the use of a circular track, which has the advantages of simple structure and small moving distance when marshaling of the adsorption sections is changed; but its disadvantage is that the whole apparatus has a large footprint and cannot be adjusted.

Figure 18:
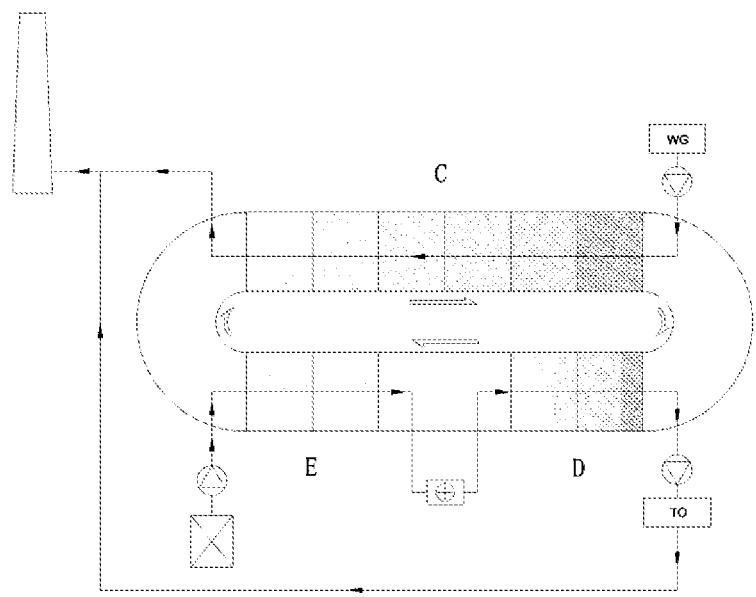
FIG. 18 is a further form of the apparatus shown in FIG. 17.

FIG. 18 illustrates the use of a kidney ellipsoid-shaped track, which has the advantages that the apparatus is rectangular, saves the area and is easy to adjust, and the adsorption sections are in a straight barrel shape, making it easy to keep the working gas flow uniform; but its disadvantage is that the moving distance is large when the marshaling of the adsorption sections is changed.

Figure 19:
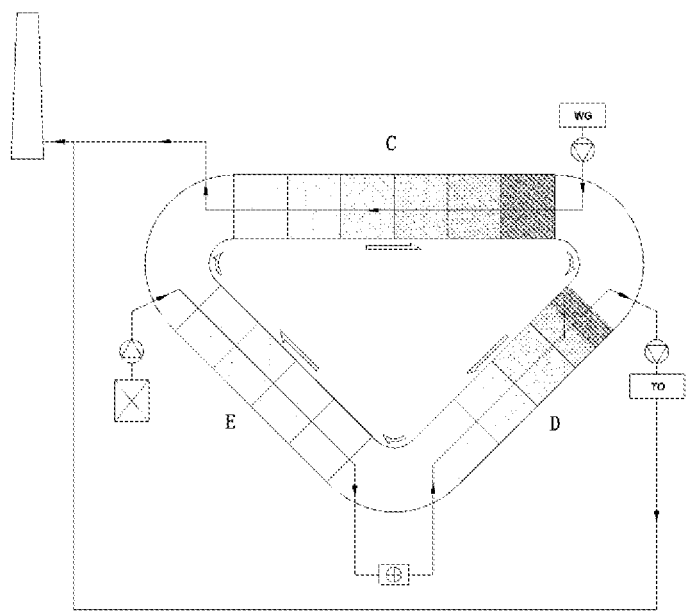
FIG. 19 is a yet further form of the apparatus shown in FIG. 17.

FIG. 19 illustrates the use of a track in a shape of a triangle with rounded corners. When the adsorption bed C, the desorption apparatus D and the heat recovery apparatus E need to use approximately the same number of adsorption sections in a process, this track mode can be used.

Figure 20:
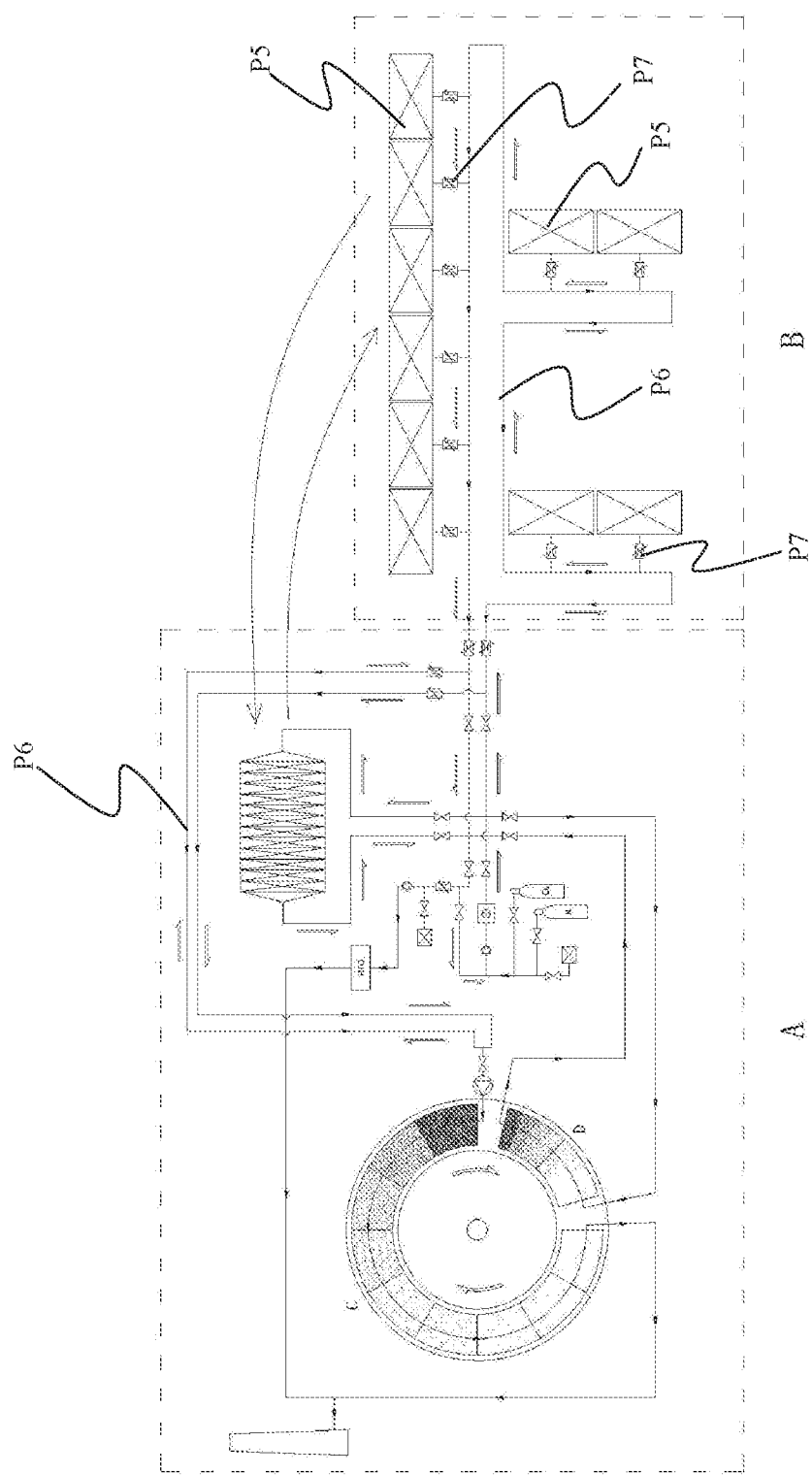
FIG. 20 is a schematic diagram of device pipelines in a whole process of a casting flue gas treatment apparatus.

Embodiment 8: Whole Process System Configuration of a Casting Flue Gas Treatment Apparatus Reference is made to FIG. 20, which shows a whole process system of a casting flue gas treatment apparatus configured according to a field model of treating flue gas generated by resin mold pouring in a foundry. The system comprises a zone A, i.e. a treatment device configuration zone, and a zone B, i.e. a collection pipeline and filtration and condensation surface adsorber configuration zone.

In order to make the system simpler, the casting flue gas treatment apparatus uses the simple structure of Embodiment 6, but actually, using the structure of Embodiment 7 is more practical. In this technical field, those of ordinary skill have no difficulty in making switching between them.

In the figure, the solid arrow of a pipeline that overlaps a solid line representing a conveying pipeline P6 indicates the direction of gas flow in the flue gas treatment process, and the hollow arrow parallel to the solid line indicates the flow direction of a high-temperature gas in the high-temperature regeneration process of removing the macromolecular organic matter accumulation on filtration and condensation surface adsorbers P5 and a polluted gas collection and conveying pipeline P6.

The filtration and condensation surface adsorbers P5 are dispersed or clustered in each station of a pouring workshop, and throttle valves P7 are arranged between the filtration and condensation surface adsorbers and the conveying pipeline P6 to control the gas flow balance at different positions.

Figure 21:
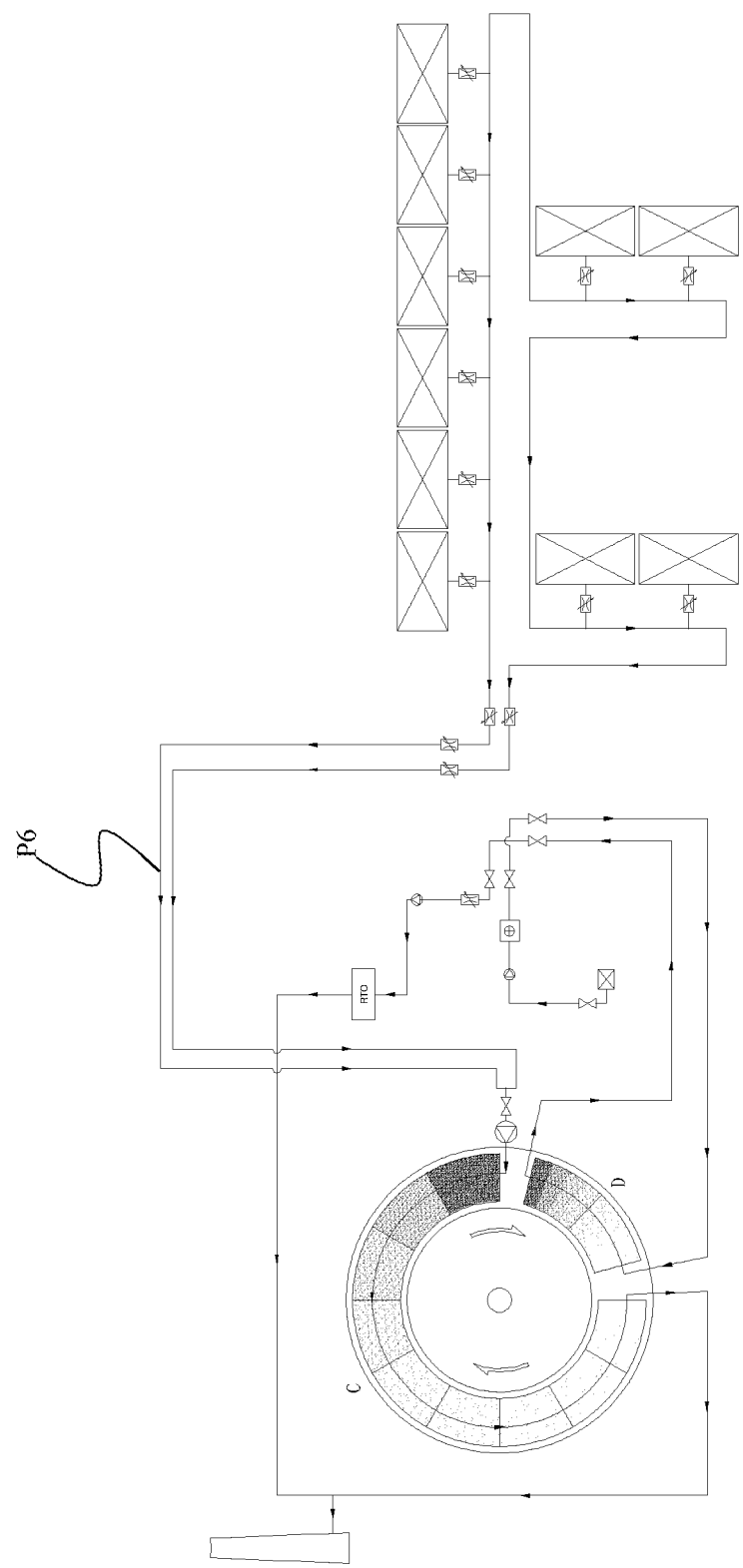
FIG. 21 is a schematic diagram of the operation of related device pipelines in a normal adsorption operation state of casting flue gas treatment.

Referring to FIG. 21, the conveying pipeline P6 is designed as a double-pipe loop, and during the normal collection and treatment operations of polluted gas, the pipeline is in a double-pipe parallel conveying mode.

Figure 22:
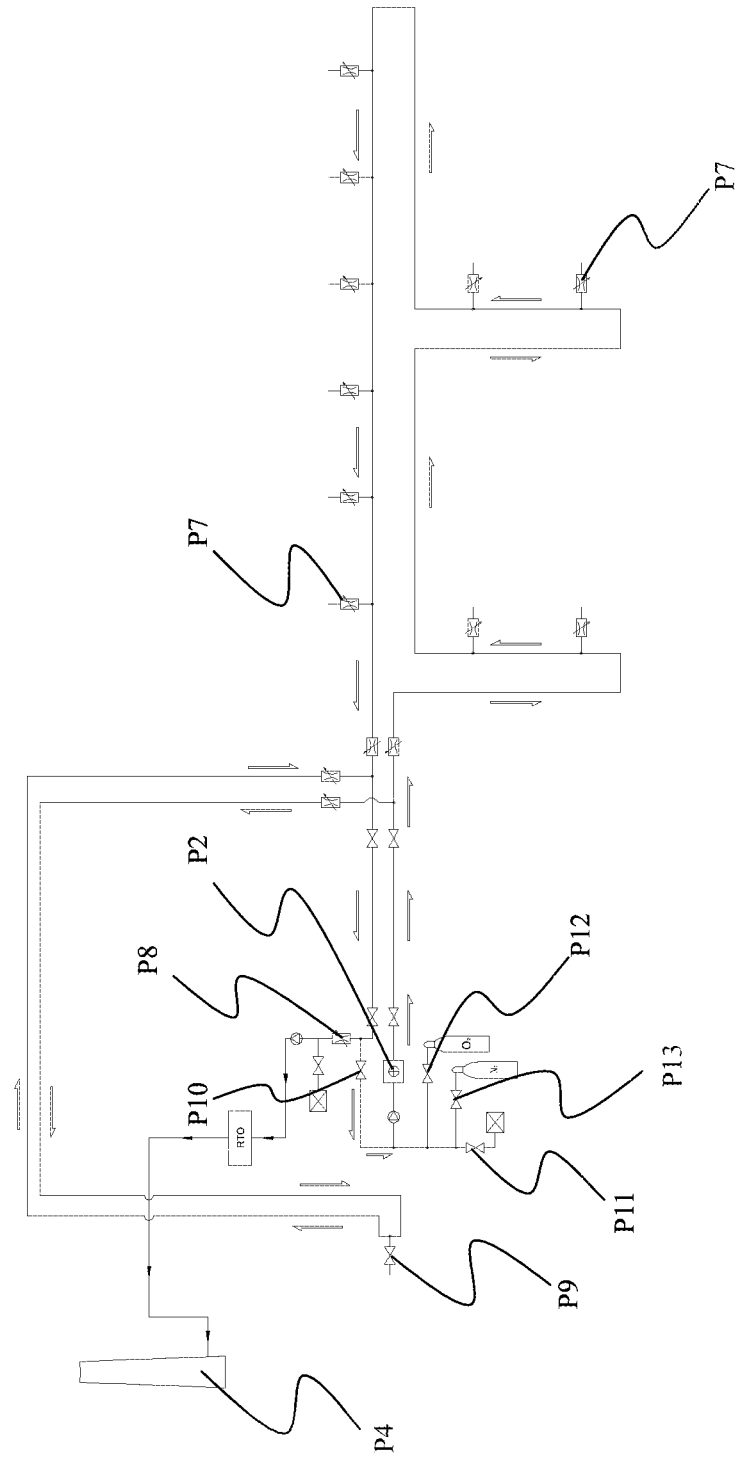
FIG. 22 is a schematic diagram of the operation of related device pipelines in a regeneration operation state of a filtration and condensation surface adsorber.

Referring to FIG. 22, when high-temperature regeneration of the conveying pipeline is performed, each throttle valve P7 and a stop valve P9 between the conveying pipeline and an adsorption and concentration apparatus are closed, and the conveying pipeline forms an annular passage. When the regeneration operation starts, a stop valve P10, an air source stop valve P1 and an oxygen source stop valve P12 are closed, and a nitrogen source stop valve P13 is opened, so that nitrogen enters the pipeline, and the air in the pipeline is exhausted. The stop valve P10 is opened, and the gas heating apparatus P2 is stated to heat the whole conveying pipeline.

During this period, nitrogen is continuously replenished into the pipeline, and a throttle valve P8 and the pressure of the pipeline are controlled. Excess gas is discharged through the chimney P4 after being treated by a regenerative thermal oxidizer (RTO).

When the temperature of the pipeline rises to a suitable temperature, such as 450-650° C., the calorific value of the discharged gas decreases to a safe value. If self-sustained combustion of the RTO cannot be maintained, the oxygen source stop valve P12 is opened, oxygen is slowly injected into the pipeline, and coke and deposited carbon in the pipeline are removed by oxidation at high temperatures, finally the nitrogen, the oxygen source and the gas heating furnace are switched off, the air source stop valve P11 is opened, and air is introduced to cool the pipeline, thereby ending the high-temperature regeneration process of the conveying pipeline.

Figure 23:
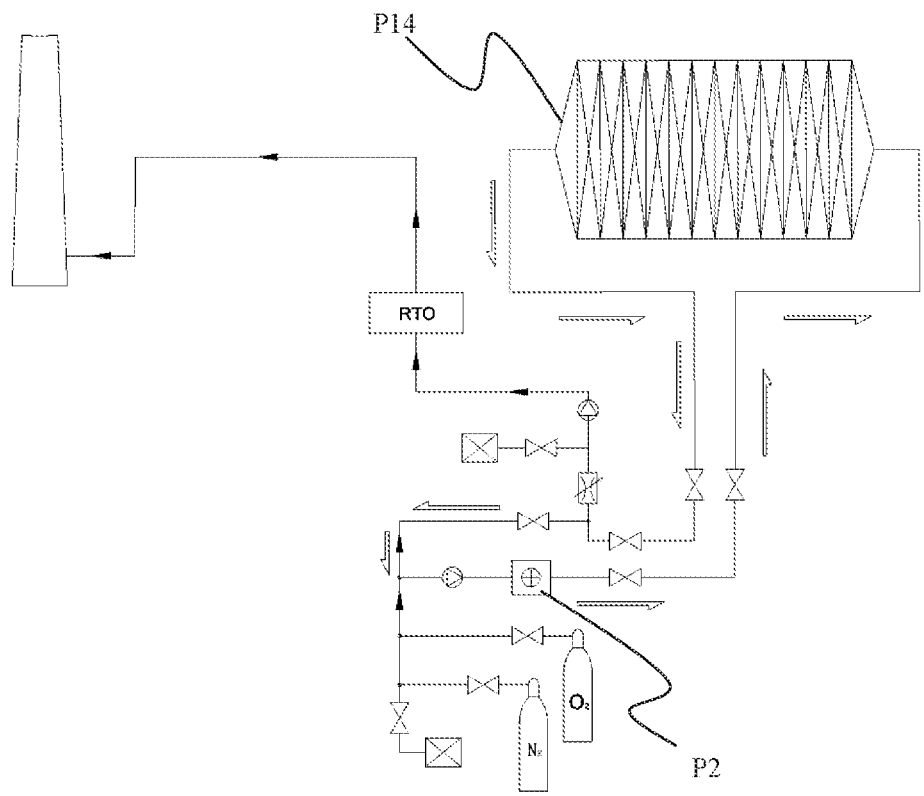
FIG. 23 is a schematic diagram of the operation of related device pipelines in a regeneration operation state of a casting flue gas collecting and conveying pipeline.

Referring to FIG. 23, the regenerative furnace of the filtration and condensation surface adsorber is identified by P14. The regenerative furnace P14 is a heat-resistant and heat-insulating cavity, two ends of which are connected to the high-temperature regeneration conveying pipeline including the gas heating apparatus P2, the filtration and condensation surface adsorber where macromolecular organic matters are accumulated is placed in the cavity, and high-temperature regeneration of the filtration and condensation surface adsorber can be performed by using a process similar to that of high-temperature regeneration of the conveying pipeline.

Figure 24:
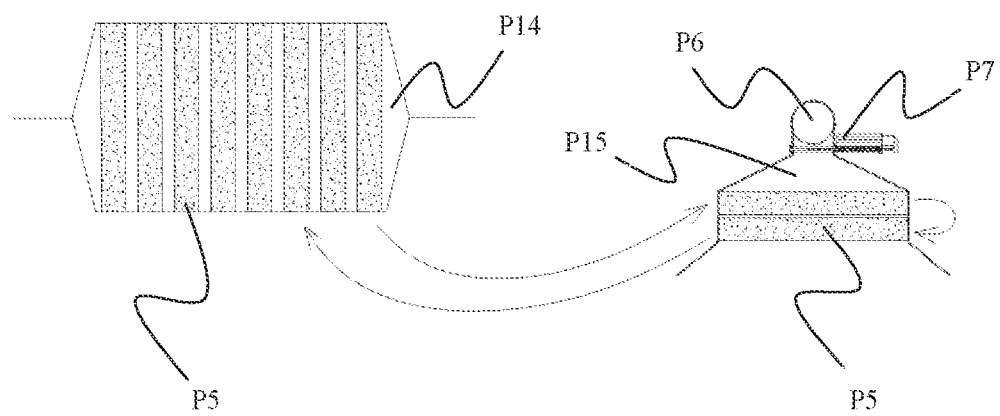
FIG. 24 is a schematic diagram of an installation mode and a use method of a filtration and condensation surface adsorber.

Reference is made to FIG. 24, which shows a circulation process of the filtration and condensation surface adsorber P5 between the filtration and adsorption position and the regenerative furnace P14. In this figure, P7 is a throttle valve, P16 is a gas collecting hood, and P6 is a flue gas conveying pipe.

What is claimed is:

1. A gas adsorption and separation apparatus, comprising:
an adsorption functional module and a further functional module, wherein
a main functional portion of the adsorption functional module is an adsorption series composed of two or more adsorption units arranged in sequence,
the adsorption series comprises a head end and a tail end,
a gas to be separated passes through the adsorption series in a direction from the head end to the tail end,
when reaching a preset degree of saturation adsorption of the adsorbate gas, the adsorption unit located at the head end is detached from the adsorption series and enters the further functional module comprising a desorption apparatus and sequentially re-enters the adsorption series from the tail end after a further process treatment including a desorption treatment is completed,
each of h adsorption units is an adsorptive fixed bed composed of an adsorbent and a mechanical support structure,
the adsorption unit which has completed saturated adsorption is referred to as a saturated adsorption unit, and the adsorption unit which has completed desorption and regeneration is referred to as a regenerated adsorption unit, and
the adsorption-desorption mode used is temperature swing adsorption, a main functional portion of the desorption apparatus is a desorption series composed of two or more saturated adsorption units arranged in sequence, which comprises a saturation end and a regeneration end, a high-temperature desorption gas passes through the desorption series in a direction from the regeneration end to the saturation end to generate a concentrated adsorbate gas, and the saturated adsorption unit is detached from the desorption series after completing desorption and regeneration.

2. The gas adsorption and separation apparatus according to claim 1, wherein the further functional module further comprises a thermal regeneration apparatus, which transfers, to the desorption gas, heat contained in the regenerated adsorption unit which has completed the desorption and regeneration and is in a high-temperature state.

3. The gas adsorption and separation apparatus according to claim 2, wherein a main functional portion of the thermal regeneration apparatus is a thermal regeneration series composed of two or more high-temperature regenerated adsorption units arranged in sequence, which comprises a hot end and a cold end, the high-temperature thermally regenerated adsorption unit that has completed the desorption is added into the thermal regeneration series from the hot end, a thermal regeneration gas passes through the thermal regeneration series in a direction from the cold end to the hot end and is heated to generate the high-temperature desorption gas, which enters the desorption apparatus, and a low-temperature regenerated adsorption unit that has completed heat exchange is detached from the thermal regeneration series from the cold end.

4. The gas adsorption and separation apparatus according to claim 1, wherein the transfer and conversion of the adsorption unit between the functional modules are completed through a unit moving apparatus which is capable of transferring the adsorption unit between the functional modules.

5. The gas adsorption and separation apparatus according to claim 2, wherein the adsorption-desorption mode used is temperature swing adsorption, and the conversion of the adsorption unit among an adsorption apparatus, the desorption apparatus and the thermal regeneration apparatus is implemented by on-off and switching of pipeline valves.

6. The gas adsorption and separation apparatus according to claim 2, wherein the adsorption units constituting the adsorption apparatus, the thermal regeneration apparatus and a recovery apparatus unidirectionally and intermittently move along a closed track in a marshaled or separate manner under the driving of power, and an adsorption bed, the thermal regeneration apparatus and the recovery apparatus each form a marshaling, and the conversion of an adsorption section between the adsorption bed, the thermal regeneration apparatus and the recovery apparatus is completed through marshaling change.

7. The gas adsorption and separation apparatus according to claim 6, wherein the closed track has any shape of a circle, a kidney ellipsoid or a triangle with rounded corners.

8. The gas adsorption and separation apparatus according to claim 5, wherein the on-off and switching of the pipeline valves are implemented by a pipeline switching disc comprising a series of stop valves and a group of switching valves.

9. A gas adsorption and separation apparatus, comprising: an adsorption functional module and a further functional module, wherein
a main functional portion of the adsorption functional module is an adsorption series composed of two or more adsorption units arranged in sequence,
the adsorption series comprises a head end and a tail end,
a gas to be separated passes through the adsorption series in a direction from the head end to the tail end,
when reaching a preset degree of saturation adsorption of the adsorbate gas, the adsorption unit located at the head end is detached from the adsorption series and enters the further functional module comprising a desorption apparatus and sequentially re-enters the adsorption series from the tail end after a further process treatment including a desorption treatment is completed,
each of the adsorption units is an adsorptive fixed bed composed of an adsorbent and a mechanical support structure,
the adsorption unit which has completed saturated adsorption is referred to as a saturated adsorption unit, and the adsorption unit which has completed desorption and regeneration is referred to as a regenerated adsorption unit, and,
wherein the adsorption-desorption mode used is temperature and pressure swing adsorption, the further functional module comprises a recirculating air heating apparatus and a vacuum desorption apparatus, and the conversion of the adsorption unit among the adsorption apparatus, the recirculating air heating apparatus and the vacuum desorption apparatus is implemented by means of a pipeline switching disc comprising a series of stop valves and a group of switching valves, and the adsorption unit that has completed saturated adsorption completes desorption by the dual actions of the recirculating air heating apparatus and the vacuum desorption apparatus.

10. The gas adsorption and separation apparatus according to claim 1, wherein the further functional module further comprises an adsorption unit storage and supply apparatus and an adsorption unit recovery apparatus; in a working process of the adsorption functional module, the adsorption unit storage and supply apparatus adds adsorption units one by one from the tail end of the adsorption series, the adsorption unit recovery apparatus recovers saturated adsorption units one by one from the head end of the adsorption series and stores the recovered saturated adsorption units in a sealed manner, regenerated adsorption units, which are generated after the saturated adsorption units stored in the sealed manner have completed a process treatment including desorption treatment in the further functional module comprising the desorption apparatus, are accommodated and stored by the adsorption unit storage and supply apparatus.

11. A method for treating flue gas containing macromolecular colloids by using the gas adsorption and separation apparatus according to claim 1, comprising the following conditions and steps:
A: a flue gas treatment apparatus used comprises an adsorption bed for treating gas and a regeneration apparatus for regenerating an adsorbent, the adsorption bed is divided into a plurality of adsorption sections along a path through which the flue gas passes, the adsorption sections are communicated in sequence and are capable of being transferred or converted between the adsorption bed and the regeneration apparatus in sequence, the adsorption section at a flue gas inlet is an initial section, the adsorption section at a flue gas outlet is a final section, a flue gas inlet end of the adsorption bed is an initial end, and a flue gas outlet end of the adsorption bed is a final end;
B: the flue gas containing the macromolecular colloids continuously passes through the adsorption bed, and is discharged from the flue gas treatment apparatus after the adsorption purification process is completed;
C: when an adsorbent surface of the initial section is covered by the macromolecular colloids to a certain extent, the adsorption section is detached from the adsorption apparatus and transferred to the regeneration apparatus for desorption treatment, and a new or regenerated adsorption section is supplemented at the final end of the adsorption bed;
D: the adsorption section that has completed adsorption and been transferred to the desorption apparatus is subjected to a conventional desorption temperature treatment, and carbonization regeneration and ashing regeneration are superimposed at a desired frequency on the basis of the conventional desorption temperature treatment; and
E: the adsorption section that has completed the above regeneration treatment re-enters the adsorption bed.

12. The method for treating flue gas containing macromolecular colloids by using an adsorption concentration method according to claim 11, wherein step F is added between step D and step E, with the following specific content: a regeneration gas passes through the adsorption section in a high-temperature state that has completed regeneration, then passes through a gas heating apparatus to raise the gas temperature to a treatment temperature used in step D, and then enters the regeneration apparatus.

* * * * *